(12) United States Patent
Duruoz et al.

(10) Patent No.: US 6,487,642 B1
(45) Date of Patent: Nov. 26, 2002

(54) COMMAND MANAGER

(75) Inventors: Chem I. Duruoz, San Francisco, CA (US); Taner Ozcelik, Palo Alto, CA (US); Pattabiraman Subramanian, Santa Clara, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 09/177,214

(22) Filed: Oct. 22, 1998

(51) Int. Cl.[7] ............................................. G06F 12/08
(52) U.S. Cl. ....................... 711/145; 709/100; 709/102; 711/146
(58) Field of Search ................................. 709/100, 102, 709/108; 386/68, 80, 81, 111, 124; 711/140, 141, 142, 143, 144, 145, 146, 123, 129, 139

(56) References Cited

U.S. PATENT DOCUMENTS

| | | | |
|---|---|---|---|
| 5,553,095 A | * 9/1996 | Engdahl et al. | 375/222 |
| 5,592,664 A | * 1/1997 | Starkey | 707/1 |
| 5,684,917 A | 11/1997 | Yanagihara et al. | 386/80 |
| 5,712,946 A | 1/1998 | Yanagihara et al. | 386/80 |
| 5,974,530 A | * 10/1999 | Young | 712/43 |
| 6,260,117 B1 | * 7/2001 | Donal Lee et al. | 711/146 |

* cited by examiner

Primary Examiner—Majid Banankhah
(74) Attorney, Agent, or Firm—Wood, Herron & Evans, L.L.P.

(57) ABSTRACT

This command manager is an Application Programming Interface (API) which provides a method for receiving and buffering commands from the host so that the host need not wait for the command to be executed, sorting these commands so that time-critical commands are executed appropriately, scheduling nonexclusive commands to the appropriate time, allowing for the prioritization of nonexclusive commands, providing macro command algorithms to allow for simplified interface with the host, providing micro command pass-through to provide an API with flexibility, and provide acknowledgment capability to the host when the command is executed.

11 Claims, 18 Drawing Sheets

COMMAND MANAGER

CROSS-REFERENCE TO RELATED APPLICATIONS

This application is related to the following co-pending and commonly owned application which was filed on even date herewith by Cem Duruoz, Taner Ozelik and Gong-san Yu: U.S. Ser. No. 09/177,261 entitled "METHOD AND APPARATUS FOR A VIRTUAL SYSTEM TIME CLOCK FOR DIGITAL/AUDIO/VIDEO PROCESSOR", now U.S. Pat. No. 6,363,207. This patent is hereby incorporated by reference herein.

FIELD OF THE INVENTION

BACKGROUND

The present invention relates to methods for receiving digital audio and video processing commands from a host processor, prioritizing the commands according to programmable criteria, and executing the commands on a reduced instruction set processor.

Techniques for digital transmission of video promise increased flexibility, higher resolution, and better fidelity. Recent industry collaborations have brought digital video closer to reality; digital video transmission and storage standards have been generated, and consumer digital video products have begun to appear. The move toward digital video has been encouraged by the commercialization of digital technologies in general, such as personal computers and compact discs, both of which have increased consumer awareness of the possibilities of digital technology.

Personal computers, which have recently become common and inexpensive, contain much of the computing hardware needed to produce digital video, including a microprocessor/coprocessor for performing numeric calculations, input and output connections, and a large digital memory for storing and manipulating image data. Unfortunately, personal computers are not suitable for consumer digital video reception, because the microprocessor in a personal computer is a general purpose processor, and typically cannot perform the calculations needed for digital video fast enough to produce full-motion, high definition video output.

Accordingly, special purpose processors, particularly suited for performing digital video-related calculations, have been developed for use in digital video receivers for consumer applications. A specific processor of this kind is disclosed in commonly-assigned, copending U.S. patent application Ser. No. 08/865,749, entitled SPECIAL PURPOSE PROCESSOR FOR DIGITAL AUDIO/VIDEO DECODING, filed by Moshe Bublil et al. on May 30, 1997, which is hereby incorporated by reference herein in its entirety, and a memory controller for use therewith is disclosed in commonly-assigned, copending U.S. patent application Ser. No. 08/846,590, entitled "MEMORY ADDRESS GENERATION FOR DIGITAL VIDEO", filed by Edward J. Paluch on Apr. 30, 1997, which is hereby incorporated herein in its entirety.

The above-referenced U.S. patent applications describe an application specific integrated circuit (ASIC) for performing digital video processing, which is controlled by a reduced instruction set CPU (RISC CPU). The RISC CPU controls computations and operations of other parts of the ASIC to provide digital video reception. As is typical of CPU's of many varieties, the CPU described in the above-referenced U.S. patent applications supports flow control instructions such as BRANCH, CALL and RETURN, as well as providing hardware interrupt services.

Due to the limitations of the RISC CPU, a task and stack manager procedure is required to monitor task flags, prioritize task flags, manage subroutine calls (the hardware does not support nesting of subroutine calls), and provide virtual instruction memory management. A specific processor of this kind is disclosed in commonly-assigned, copending U.S. patent application Ser. No. 08/866,419, entitled TASK AND STACK MANAGER FOR DIGITAL VIDEO DECODING, filed by Taner Ozcelik et al. on May 30, 1997, which is hereby incorporated by reference herein in its entirety.

However, even with task and stack management, the host processor would have to be intimately integrated with the ASIC in order to command it. For example, in order for the host to command the ASIC to perform complex operations, the host would have to generate a number of specific commands and also would have to prioritize and schedule each specific command and monitor its completion before submitting the next specific command. The host would also have to become involved in synchronizing some commands with events such as during vertical blanking or over a number of video frames.

SUMMARY

In accordance with the principles of the present invention, these difficulties are overcome by a novel method for implementing and managing an Application Programming Interface (API) with a command manager.

This command manager receives commands from the host so that the host need not wait for the command to be executed, sorts these commands so that time-critical commands are executed appropriately, schedules nonexclusive commands to the appropriate time, allowing for the prioritization of nonexclusive commands, performs macro command algorithms to allow for simplified interface with the host, provides micro command pass-through to provide an API with flexibility, and provides acknowledgment capability to the host when the command is executed.

The command manager works in coordination with a state transition handler to ensure that proper play modes are executed. The commands placed in command buffers by the command manager are routinely read by the state transition handler to execute the commands.

Specifically, in a first aspect, the invention includes increasing the speed of command execution by performing a tree search rather than a flat table lookup search. Commands are grouped into categories.

In a second aspect, the categorization of commands lends itself to modularizing the process accommodating the limited resident memory, allowing less time-critical routines to be loaded from nonresident memory.

In a third aspect, the categorization of commands allows treating commands as either exclusive or nonexclusive commands, further expediting command management by discontinuing other exclusive commands when a new exclusive command is received.

In a fourth aspect, the categorization of commands as nonexclusive provides an opportunity to schedule these events at appropriate times, including the ability to access predetermined criteria for sorting nonexclusive command execution according to application priority.

In a fifth aspect, the subcategorization of commands to a particular commands allows execution of the steps specific to the particular command, allowing macro commands that reduce the process oversight required for the host processor.

In a sixth aspect, the command manager will accept a flag bit from the host processor requesting acknowledgement when a command is completed.

In a seventh aspect, the command manager utilizes the same acknowledgement function for all commands in a particular subcategory, reducing the program size required to implement the command manager.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

ASIC Architecture

Figure 1:
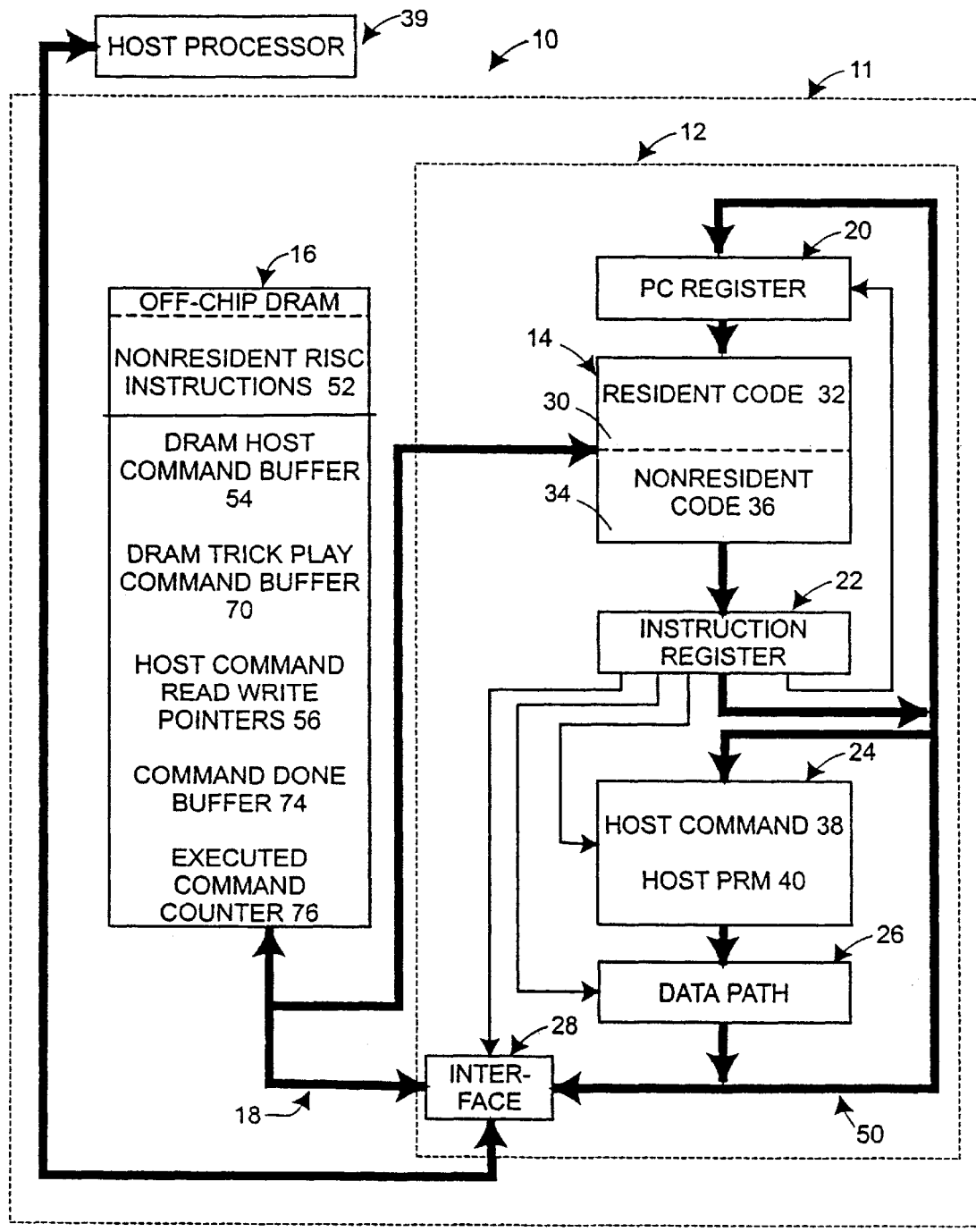
FIG. 1 is a block diagram of specific components of the application specific integrated circuit (ASIC) described in the above referenced U.S. patent applications, showing in particular the off-chip dynamic random access memory (DRAM) and the data stored therein, the reduced instruction set central processing unit (RISC CPU) for controlling the ASIC, and components of the RISC CPU and the data stored therein.

Referring to FIG. 1, a digital audio/visual control system 10 is provided. The general structure of an Application Specific Integrated Circuit (ASIC) 10, including a Reduced Instruction Set (RISC) Central Processing Unit (CPU) 12 for a controlling digital audio/video decode by the ASIC, can be discussed. The detailed structure of the RISC CPU 12 and of elements of the ASIC 11 is described in the above referenced U.S. patent applications. For present purposes, only a few specifically relevant components of the RISC CPU 12 of the ASIC 11 will be discussed.

Specifically, the RISC CPU 12 includes an instruction memory 14 for storing instructions to be executed by the RISC CPU 12 in order to control digital audio/video processing performed by the ASIC 11. These instructions are initially loaded into instruction memory 14 from an off-chip dynamic random access memory (DRAM) 16, via a first data bus 18 connected between DRAM 16 and the RISC CPU 12.

The address of an instruction in instruction memory 14 to be executed by the RISC CPU 12 is identified by a program counter (PC) register 20. The instruction read from instruction memory 14 is delivered to an instruction register 22, and used to control operations of the RISC CPU 12. As described in the above-referenced U.S. patent applications, instructions are 16-bits wide, and control a wide variety of operations of the RISC CPU 12, including operations of a register file 24, a data path 26, a memory interface (I/F) 28, and other elements described in the above-referenced U.S. patent applications.

Instruction memory 14 further includes several interrupt service routines, including one that activates the command manager. These interrupt routines are activated by hardware of the RISC CPU 12 upon receipt of an interrupt.

Instruction memory 14 also includes other resident code 32 including routines for carrying out tasks of the command manager.

All of the foregoing routines are permanently resident in instruction memory 14, that is, these routines are transferred into a resident code area 30 of the instruction memory 14 when the ASIC 11 is initially booted, and are thereafter left unchanged. There is, however, a nonresident code area 34 of instruction memory 14 which may contain non-resident code 36, which are swapped into instruction memory 14 as needed during execution of a program by the RISC CPU 12. Portions of the command manager are non-resident routines stored as nonresident code 36. Specifically, at any given time, one of several non-resident (NR) code segments 36 is stored in the allocated non-resident code area of instruction memory 14. Instructions are loaded into the "non-resident" area of instruction memory 14 when those instructions are required for execution of a task or interrupt service routine, on an as-needed basis. The swapping is controlled through execution of the task and stack manager, described in an above-referenced U.S. patent application.

Among the elements of the RISC CPU 12 which are controlled by instructions is the register file 24. The register file 24 includes a number, e.g., sixty-four, 32-bit registers which are used by the RISC CPU 12 in performing calculations for audio/video digital signal decoding and processing. A few specific registers used by the RISC CPU 12 as part of command manager are illustrated in FIG. 1 and will be discussed below.

A first register in register file 24 is the host command register 38 which contains the command for the ASIC 11 from a host processor 39.

A second register in register file 24 is the host parameter (PRM) register 40 which contains the operand, if any, for the host command. Upon being activated when a host command is received, the command manager first reads the operand, if any, in the host PRM register 40 because reading the host command register 38 results in a hardware interrupt to the host processor 39. The host processor 39 may then send another command, over-writing the host command in the host command register 38 before it is read by the command manager. Moreover, as described below, the command manager may defer reading these registers for the same reason if the non-exclusive buffer is full.

Figure 2:
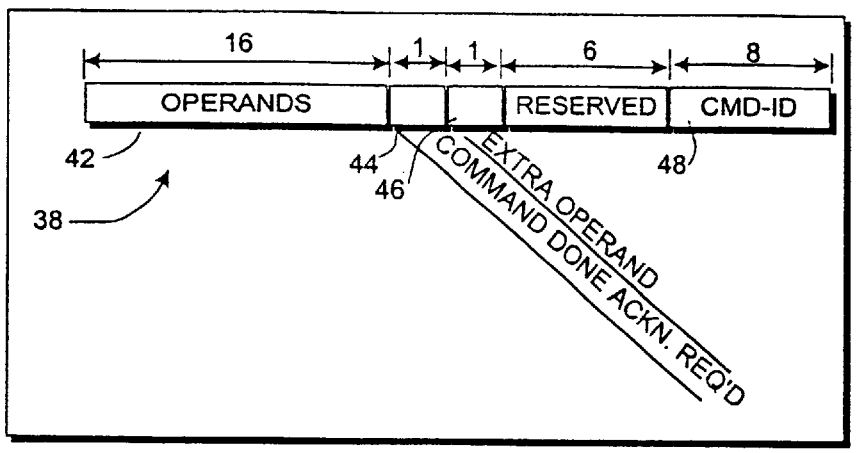
FIG. 2 is a data structure diagram of the command from host stored in the rbus RISC host command register.

The host command register 38 is 32 bits in length, as shown in FIG. 2, and includes the 16-bit operand 42, a flag bit 44 that is set high if the host processor 39 requires acknowledgment upon completion of the command, a flag bit 46 if the host command has an extra operand stored in Host PRM register 40, and an 8-bit command identifier (CMD-ID) 48.

Referring again to FIG. 1, data path 26 in RISC CPU 12 responds to instructions generated from an instruction in instruction register 22, by performing arithmetic or logical operations on the contents of registered delivered from register file 24, and delivering the results of these computations to a second data bus 50. The specific arithmetic or logical operation performed by data path 26 is determined by the opcode portion of the instruction in instruction register 22, as is described in substantially greater detail in the above-referenced U.S. patent applications.

The output of data path 26, which is schematically identified in FIG. 1 as the second data bus 50, is connected to an input of register file 24, allowing the results of arithmetic or logical computations performed by data path 26 to be stored into registers of register file 24. Furthermore, the second data bus 50 is connected to the memory interface 28, permitting the results of logical operations performed by the data path 26 to be stored into DRAM memory 16, and further permitting data stored in DRAM memory 16 to be retrieved to the second data bus 50 and stored, for example, into a register of register file 24.

These data structures stored in off-chip DRAM 16 include NR RISC instructions 52 that can be swapped into the NR code area 34 of instruction memory 14.

Figure 3:
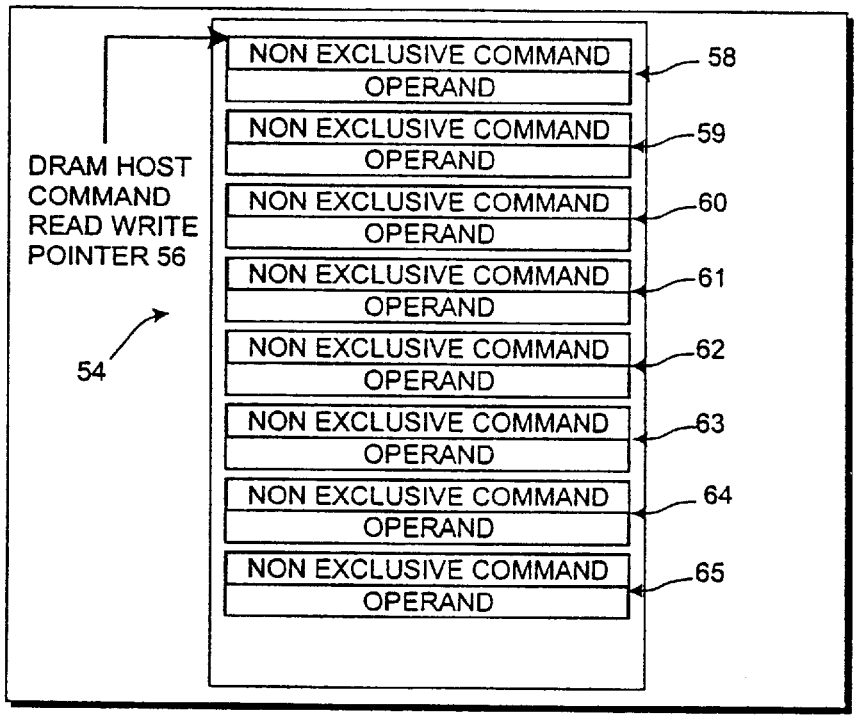
FIG. 3 is a data structure diagram of the non-exclusive commands stored in the DRAM at DRAM host command buffer.
Figure 4:
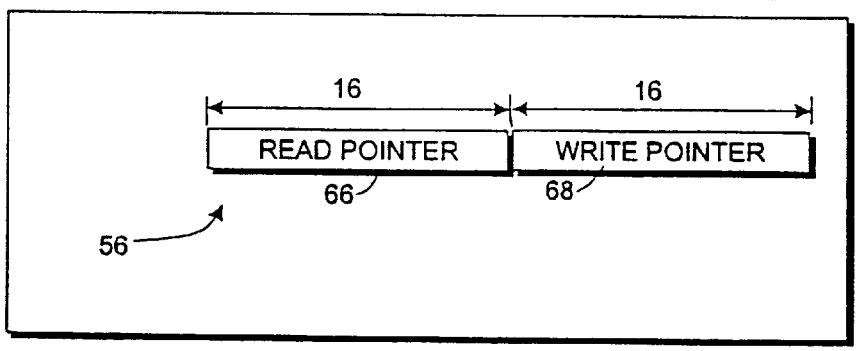
FIG. 4 is the data structure diagram of the DRAM host command read-write pointer for where the non-exclusive commands are buffered in the DRAM.

A DRAM host command buffer 54 in DRAM 16 contains non-exclusive commands. The data structure of DRAM host command buffer 54 is shown in FIG. 3. The DRAM host command buffer 54 contains eight none-exclusive command/operand pairs 58–65 and is referenced by a DRAM Host Command Read Write Pointer 56 whose data structure is shown in FIG. 4 having a 16-bit read pointer 66 and a 16-bit write pointer 68.

Figure 5:
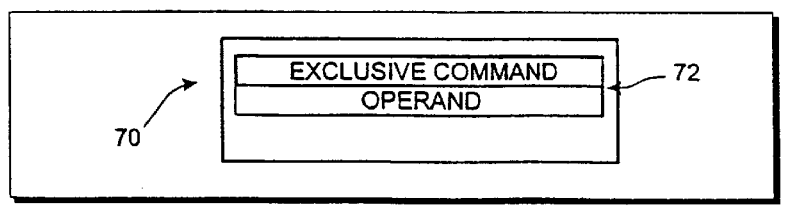
FIG. 5 is the data structure diagram of the exclusive command stored at DRAM Trick Play Command Buffer.

Referring back to FIG. 1, the DRAM 16 also contains a DRAM trick play command buffer 70 whose data structure, shown in FIG. 5, is a 32-bit exclusive command and 32-bit operand pair 72.

Referring back to FIG. 1, if acknowledgment is required by the host processor 39, the executed command is written back to a DRAM command done buffer 74 which can store the last 16 executed commands. In addition, stored in the DRAM 16 is the executed command counter 76 that counts the number of executed commands since the last interrupt to the host processor 39.

The output of data path 26 can also be delivered to the PC register 20, permitting a CALL or BRANCH instruction to directly load an address of an instruction in instruction memory 14, into PC register 20, thus causing program execution to sequence to the new address. For this purpose, there is also a connection from instruction register 14 to second data bus 50, permitting immediate values in an instruction to be delivered to PC register 20 as part of a CALL or BRANCH instruction, and permitting immediate values in an instruction to be delivered to a register of register file 24.

The foregoing hardware structure is described in schematic fashion, for the purpose of illustrating the operation of the routines described in the following figures. The above-referenced U.S. patent applications describe these hardware structures in substantially greater detail, and in particular identify the instructions and specific paths of data flow provided by the RISC CPU.

Functional Command Flow

During the discussion below, the commands from the host processor 39 will be categorized in different ways. For example, the ASIC 11 provides an application programming interface (API) to the host processor 39. The host processor can choose to provide very general commands, referred to herein as macro commands, to the ASIC 11 without the burden of supervising the required specific commands within the macro command. These macro commands are grouped as being either a system, trick play, subpicture, on screen display, video or audio command. An example of a video macro command would be "set up the final display size."

By contrast, micro commands very specifically control the digital audio/visual control system 10 and usually require a number of commands in a logical sequence in order to achieve the desired result. Micro commands are grouped as a video decode, video display, or audio command. An example of a video display micro command would be "display a field of video from the video reconstruction of data at buffer pointer."

Figure 6:
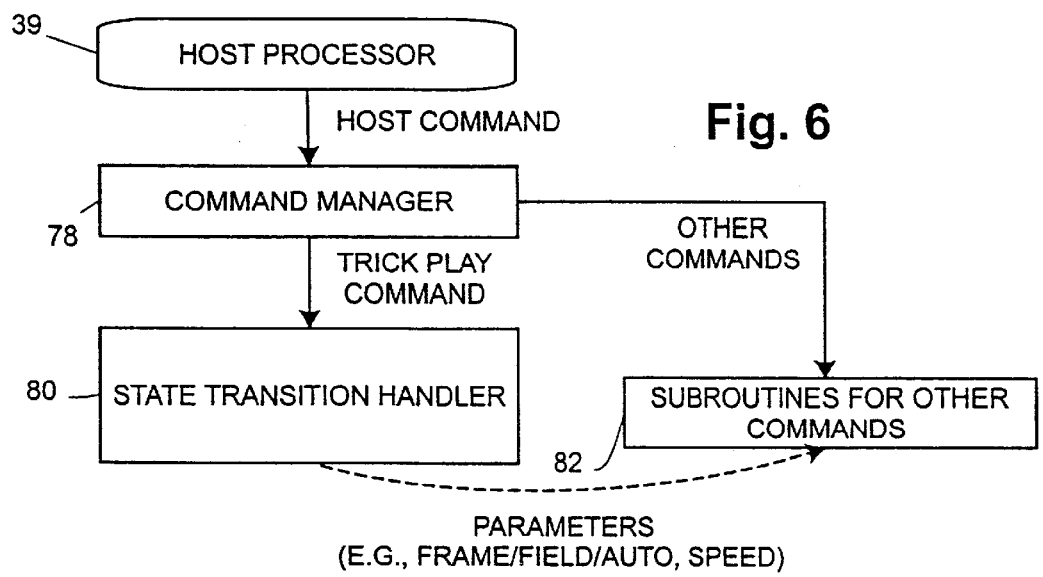
FIG. 6 is block diagram showing the functional relationship between the command flow from host, command manager, state transition handler, and subroutines.

The command manager also groups commands as to whether the command is performed exclusively or non-exclusively. Functionally, the processing of a host command from the host processor 39 by the command manager 78 is shown in FIG. 6. As will be discussed below, the command manager 78 differentiates between host commands that are in a "trick play" subgroup of macro commands (also known as "exclusive commands") and non-exclusive commands. Trick play commands are processed by buffering the command in the trick play command buffer in DRAM and setting a flag to subsequently invoke the state transition handler 80 that calls upon trick play commands subroutines (step 52). For non-exclusive commands, the command manager 78 calls upon non-exclusive command subroutines 54 which rely upon parameters set by the trick play command subroutines 82.

The trick play (exclusive) commands are (1) "Play Ready" which prepares the system to start playback immediately after the next play command is issued; (2) "Play" that commences playing audio, video and sub-picture; (3) "Pause" which pauses video and sub-picture and mutes audio; (4) "Slow Forward" which plays at an adjustable slow speed, which defaults to $\frac{1}{10}$, i.e. each frame is repeatedly displayed ten times; (5) "Fast Forward" which fast forwards by decoding and displaying reference frames only; (6) "Step Forward" which forward decodes next picture and then pauses; (7) "Fast Reverse" which fast reverses by displaying reference frames only; (8) "Reverse Decode" which reverse plays in single frame steps or at an adjustable slow speed; and (9) "Stop" which stops all processes and returns to initial state.

Figures 7A, 7B:
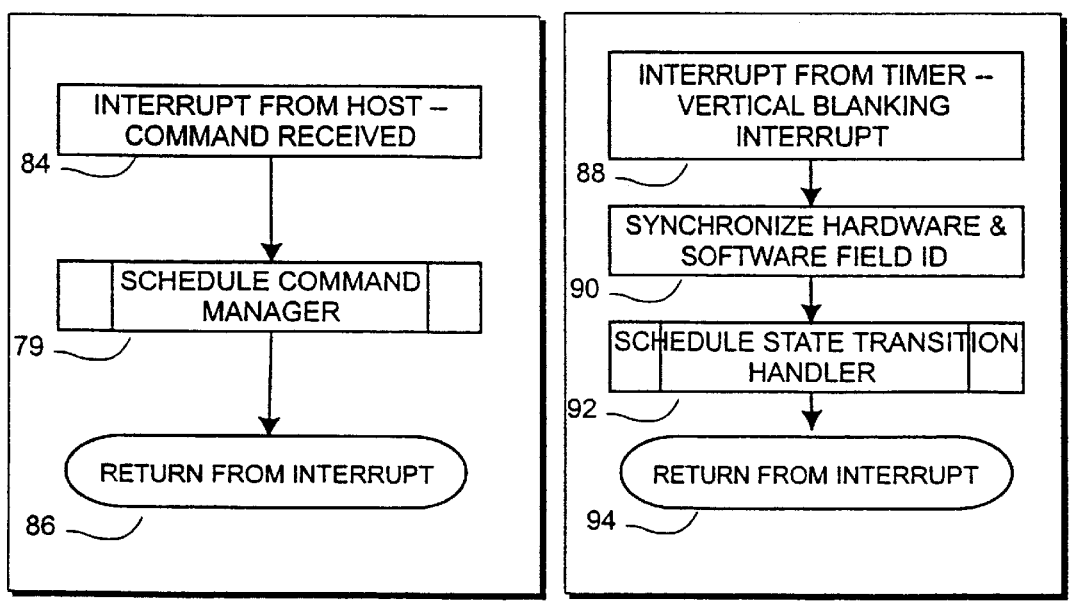
FIGS. 7A and 7B are flow diagrams of relevant portions of the digital audio/visual processor main routine that initiates the command manager and the state transition handler routines.

The scheduling of the command manager 78 and state transition handler 80 is shown in FIGS. 7A and 7B. As shown in FIG. 7A, a host command generates a hardware interrupt (step 84) which schedules the command manager 79 (FIG. 12) to store, categorize the host command, and then return (step 86). The handling of the command by the command manager 78 is discussed below. Referring to FIG. 7B, a second hardware interrupt is generated by a clock circuit internal to the ASIC (not shown). A field ID (fID) signal from the clock circuit toggles from 0 to 1 or 1 to 0 to identify the time for display of a top or bottom video field. At this time, the video display must output a new field. Following this interrupt, during a vertical blanking interval (step 88) a synchronization of the hardware and software field ID is made (step 90) to ensure that decoding and display are correct. After synchronization, the state transition handler 80 (FIG. 9) is scheduled by the task manager to make sure that the trick play state is updated in accordance with any intervening action by the command manager 78 since the last vertical blanking (step 92).

After this processing for the trick play state, routine processing for video decoding and output is performed, as denoted by step 94.

State Transition Handler

Figure 8:
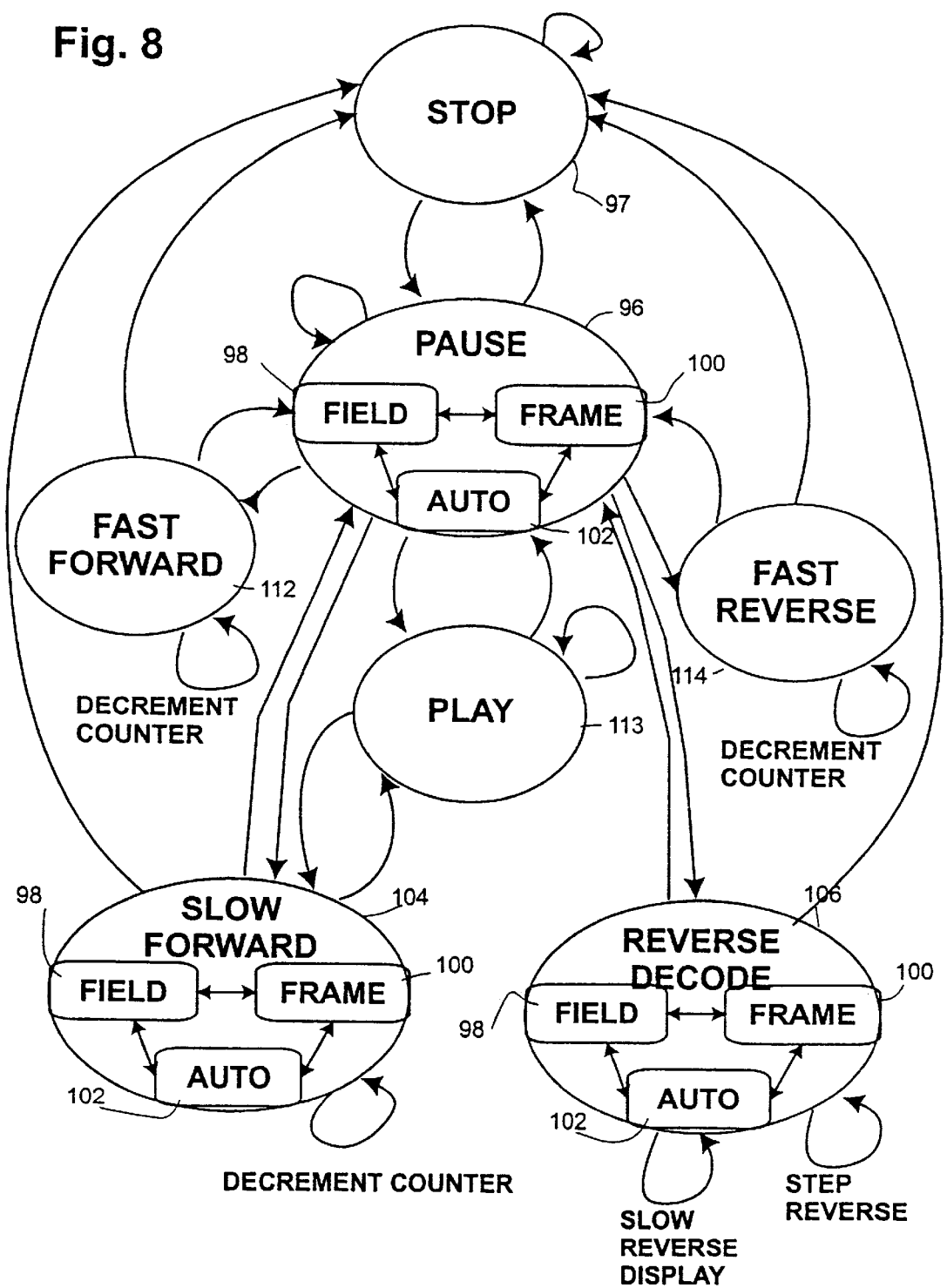
FIG. 8 is a state diagram of the allowable digital video decoding states executed by the state transition handler.

The execution of trick plays is done by the state transition handler 80 and its subroutines, enforcing the allowable transitions as shown in FIG. 8 to accomplish the trick plays. Arrows that begin and end at the same state denote actions taken during repetitions of the same state. Note that one mode mentioned above, play ready, is not depicted on FIG. 8.

A stop state 97 is provided as the initial state of the handler and can be a commanded state.

The pause state 96 causes a current frame to be repeatedly displayed. The pause state can be in three modes: field 98, frame 100, or auto 102. This relates to the way in which video images are displayed. Each picture, or frame, is composed of two interleaved fields, a field 0 which raster displays the odd numbered lines and a field 1 which raster displays the even numbered lines. In field mode 98, the fields output to form the paused image are repetitions of only field 1 of the current frame. Some video signals include data wherein field 0 and field 1 represent different times. Outputting only field 1 in this instance prevents jitter due to image motion between these fields, although at the loss of resolution. In frame mode 100, the fields output to form the paused image are repetitions of both field 0 and 1 of the current frame, which may or may not be subject to jitter depending on whether the fields are field synchronized. In auto mode 102, the paused image is in either field or frame repetition depending on whether the state transition handler detects that the video input is field synchronized.

Similarly, slow forward state 104 and reverse decode state 106 can be in these three modes since they output a paused image for a certain length of time. The slow forward state 104 achieves slow forward trick plays by decrementing a counter for the number of repetitions of a frame to display between forward steps. Similarly, the reverse decode state 106 is used in conjunction with non-exclusive commands for slow reverse display and step reverse to achieve reverse trick plays. The reverse decode state 106 makes sure that sufficient frames are reverse decoded and stored in buffers so that the non-exclusive display mode can access the required frames.

Also provided are fast forward state 112, play state 113 and fast reverse play state 114. Details of the state transition handler subroutines which perform the appropriate processing for these states are provided below.

Figure 9:
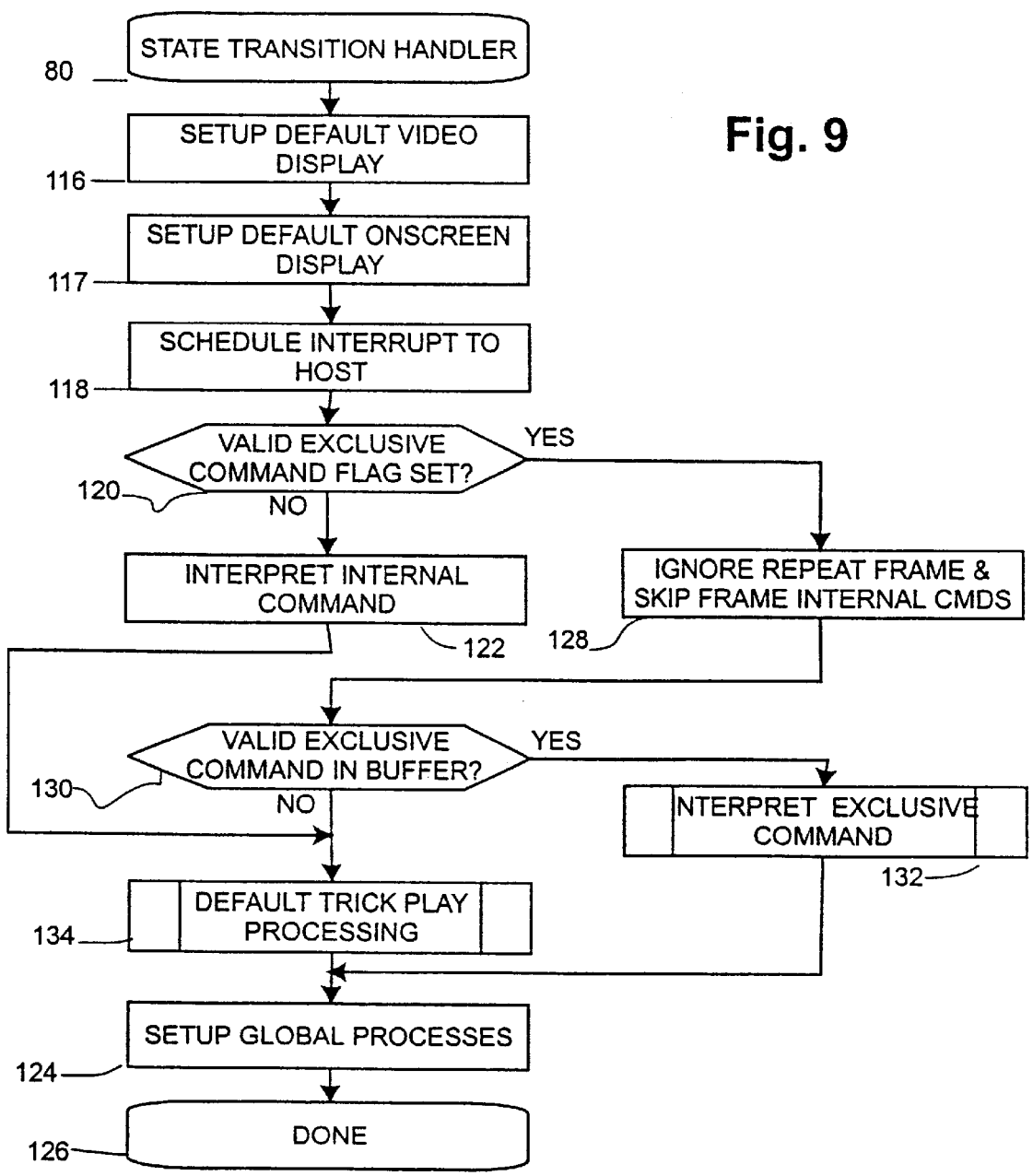
FIG. 9 is a flow diagram of the state transition handler routine.

The operation of the state transition handler 80 is shown in FIG. 9. The default video display is set up (step 116) and the default on screen display is set up (step 117). Further, an interrupt to the host is scheduled to inform the host that a frame is being processed for output (step 118). Then, a determination is made as to whether a valid exclusive (trick play) mode is active, by checking whether the exclusive command flag has been set (step 120). If not, then internal commands are interpreted, if any (step 122). These internal commands include video skip frame, video repeat frame, initial decode ready, and internal pause. These internal commands are not generated by the host processor 39 and are instead generated by the ASIC 11, e.g., during a synchronizing routine, to accomplish things such as allowing the audio and video decoding to synchronize.

Once any internal commands are interpreted, then default trick play processing (step 134) and global processes are set up (step 124) are performed. The global processes include setting an appropriate pause mode, based on a non-exclusive host command selecting a field or frame pause mode, or based on the presence of a progressive frame flag in the video data if an auto pause mode is selected by the host (FIG. 4). Further, the global processes include adjusting software time clocks as appropriate for audio/video synchronization. Then the state transition handler 80 is done for this field ID (step 126).

If the exclusive command flag is set in step 120, then the handler 80 resets any internal flags to repeat a frame or skip a frame (since trick play modes invalidate any prior synchronization) (step 128) and then the interpretation of the exclusive command is made. If there is a valid exclusive command in the buffer 70 (FIG. 5), then the appropriate subroutine for interpreting a new exclusive command is invoked (step 132). If, however, the buffer 70 is empty or contains an invalid command, then the appropriate default processing subroutine for the current trick play state is invoked (step 134). In either case, after trick play processing, global processes are set up (step 124) and the subroutine is done (step 126).

Figure 10:
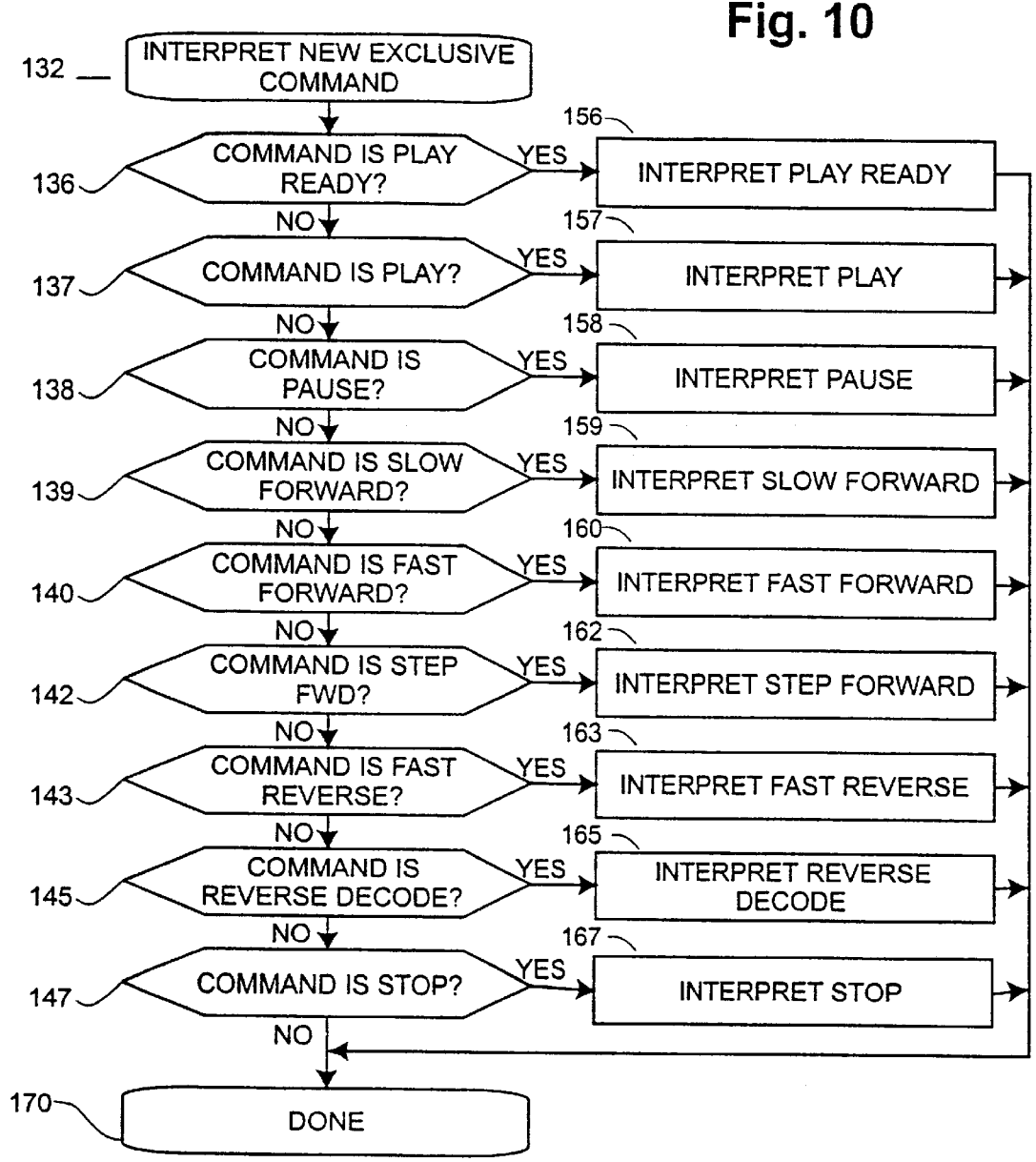
FIG. 10 is a flow diagram of the interpret exclusive command subroutine.

The interpretation of an exclusive command in step 132 is shown in FIG. 10 as a determination of whether the command is play ready, play, pause, slow forward, fast forward, step forward, fast reverse, slow reverse, or stop (steps 136–147 respectively) with each resulting in the interpretation of the command (steps 156–167 respectively). After which, the subroutine is done in step 170. These command interpretations correspond to the transitions shown on FIG. 8.

Figure 11:
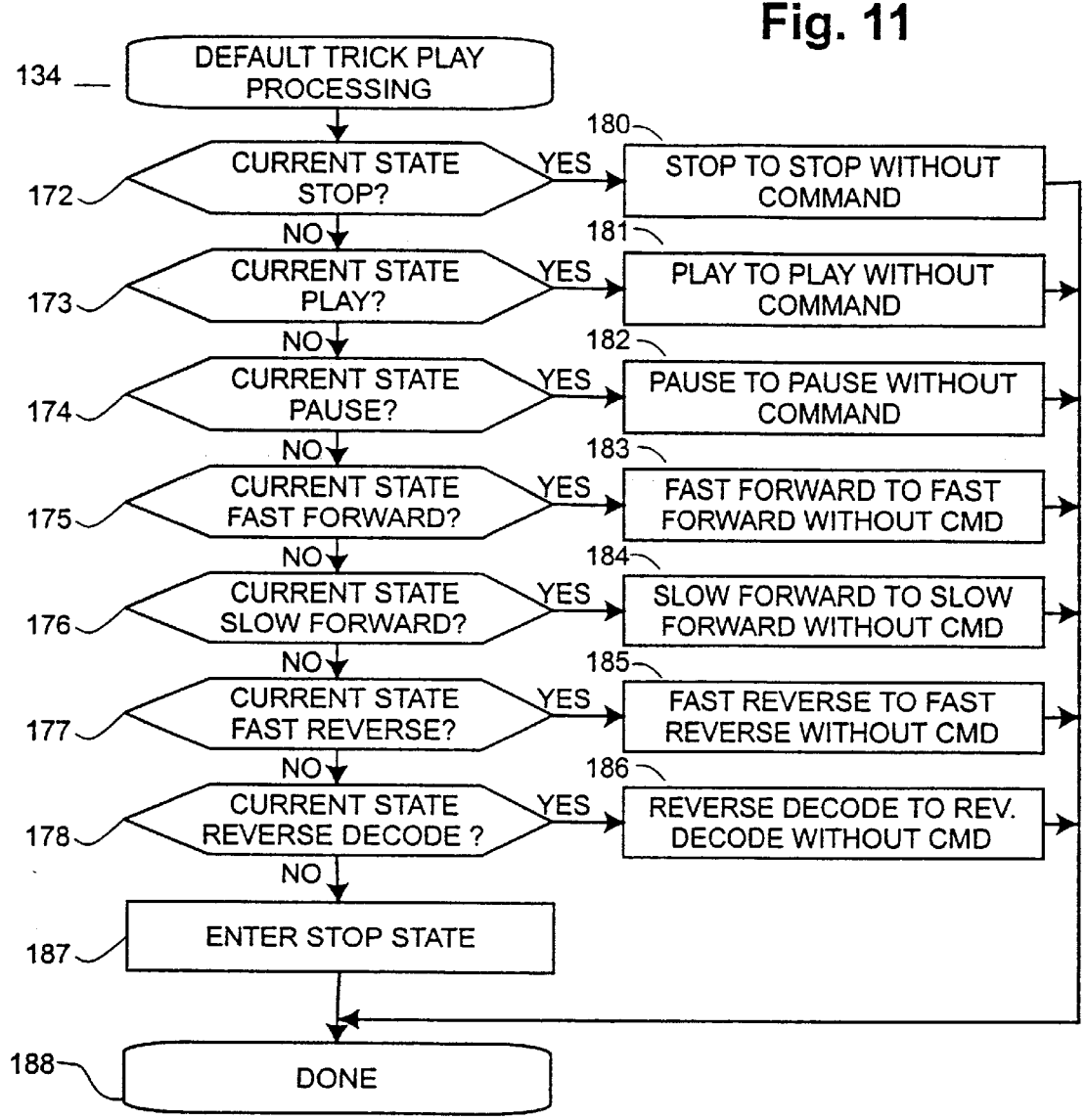
FIG. 11 is a flow chart of the default trick play processing subroutine of FIG. 9.

The default trick processing (step 134) is shown in FIG. 11 as a determination of whether the command is stop, play, pause, fast forward, slow forward, fast reverse, or reverse decode (steps 172–178 respectively) with each resulting in the interpretation of the command (steps 180–186 respectively). If for some reason a valid default state was not found, then the stop state is entered (step 187). Then the subroutine 134 is done (step 188). These interpretations correspond to the arrows beginning and ending on the same state as shown in FIG. 8.

Command Manager

Figure 12:
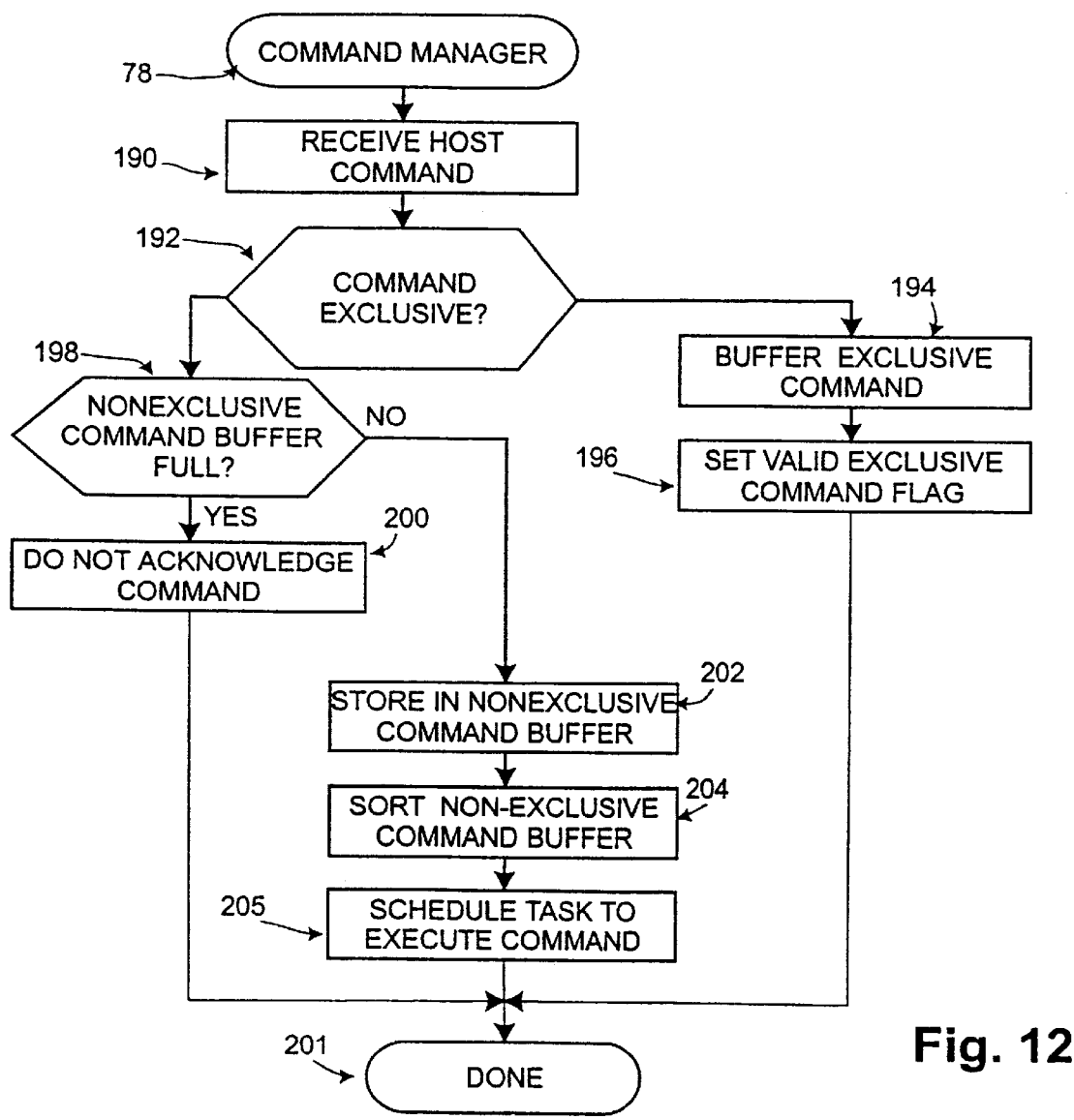
FIGS. 12 and 12A are flow charts of the command manager included in the permanent storage area of the instruction memory of the RISC CPU and virtual instruction memory of the DRAM illustrated in FIG. 1.

Referring to FIG. 12, the flow diagram of the illustrative version of the command manager 78 implements the method of receiving and categorizing host commands. The process begins at step 78 after receipt of a host command in the host command register 38 generates a hardware interrupt in the RISC CPU 12 whereupon the interrupt service routine of FIG. 7A schedules the command manager 78.

The processing step 190 executes code which receives the host command. In the preferred embodiment, this is done by first reading the host interface to get any operand and the command.

Processing then goes to step 192 to determine whether the host command is either exclusive or nonexclusive. In illustrative embodiment, all commands have an integer command identifier (ID). Exclusive commands have ID's in a particular numeric range, and non-exclusive commands have ID's outside this range. Accordingly, in step 192, the ID of a current command is compared to the exclusive range to determine whether the command is exclusive.

If the command is exclusive, the command manager 78 buffers the command and its argument, if any, (step 194) by storing them in the DRAM trick play command buffer 70, replacing, if any, an exclusive command stored in this buffer. This step could also include sorting the exclusive commands by categories to implement a two-tier search. In the illustrative embodiment, the number of exclusive commands is sufficiently small to not warrant further categorization. That is because any new exclusive host command implicitly cancels any previously received exclusive command. Then, in step 196, the valid exclusive command flag is set, and processing is done.

As discussed above, placing an exclusive command in buffer 70 and setting the valid exclusive command flag causes the state transition handler 92 to actually execute the command during the next vertical blanking cycle.

Returning to step 192, in the instance where the host command stored in the host command register 38 is determined to be non-exclusive rather than the previously discussed exclusive, processing proceeds to step 198.

Prior to any processing of the non-exclusive command, the command manager 78 checks to see whether the non-exclusive command buffer (FIG. 3) is full. In the illustrative embodiment, this check is accomplished by reading a host command buffer full flag. As noted below in connection with step 202, when storing a non-exclusive command in the non-exclusive command buffer, the command manager 78 determines whether it is at the bottom of this buffer, and if so, sets this flag. When a non-exclusive command is removed from the buffer, the flag is cleared.

When the non-exclusive command buffer is full, the command manager 78 does not process or acknowledge the host command to avoid loss of a previously received non-exclusive command, as shown in step 200. In the illustrative embodiment, this is accomplished by returning to default processing by going to the end of the subroutine (step 201). Because the command, as a result, is not acknowledged to the host, the host will then retry the command. As non-exclusive commands are executed as scheduled and the buffer emptied, room will be created so that the command can be stored during a subsequent initiation of the command manager 78.

If the non-exclusive command buffer is not full, processing proceeds to step 202 where the non-exclusive command is stored in the non-exclusive command buffer. In the illustrative embodiment, this is a buffer that holds up to eight commands as discussed above. If the buffer becomes full when the command is stored, the host command buffer full flag is set, as noted above.

Processing then optionally proceeds to step 204 where the non-exclusive commands in the non-exclusive command buffer are sorted in accordance with defined priority criteria. The default sorting is first in, first out without sorting.

The command manager then schedules a task to perform further processing of the buffered non-exclusive commands (step 205). Processing of the command manager is then done (step 201).

Figure 12A:
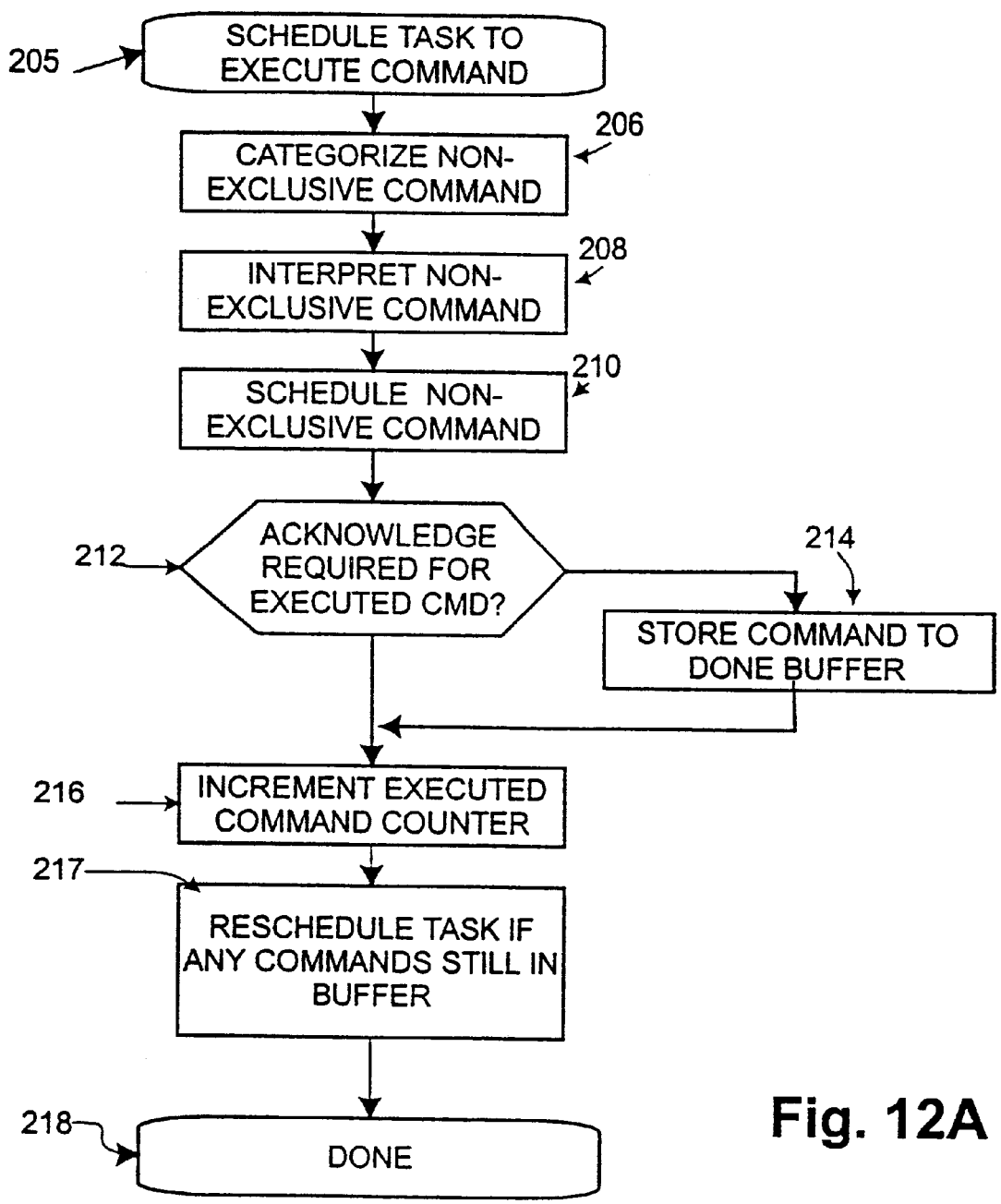

Referring now to FIG. 12A, in the task scheduled in step 205, the nonexclusive command in the first entry of the buffer 54 is then categorized (step 206) into one of the non-exclusive categories: system commands 1, system commands 2, system commands 3, sub-picture commands, on screen display commands, video commands 1, video commands 2, audio commands 1, audio commands 2, video decode commands, video display commands, audio micro commands, jacket picture display commands, and digital video broadcast (DSS) commands. These categories are each associated with a particular numeric range of command 10. Thus, to identify the category of a command, the command ID is compared to a numeric range for each category. When the command ID fits within a numeric range, it is determined that the command is in the associated category.

Once a command has been categorized, the command ID for the non-exclusive command is compared to the command ID of each command within the category, as shown in step 208, and then the command is scheduled for execution, as shown in step 210.

The search tree approach of steps 208 and 210 provide efficiencies in processing time and storage requirements. Grouping allows a smaller file to be swapped from non-resident RISC instructions 52 into the NR code area 34. The CPU 12 need only search through this smaller file to find the specific instructions. Moreover, there is more shared code for specific commands within these categories, providing efficiencies in design and code size.

Once the non-exclusive command is scheduled for execution in step 210, the completion of the host command is acknowledged, if necessary, to the host processor 39 by an interrupt message (step 212).

In the illustrative embodiment, this is accomplished by reading a flag in the host command to determine whether acknowledgment was requested by the host processor 39. If acknowledgment was requested, then processing moves to step 214 where the completed host command is stored in the command done buffer 74, and an interrupt to the host processor 39 is generated. If acknowledgment was or was not requested, processing then goes to step 216 where the executed command counter 20 is incremented.

The non-exclusive command interpreting task then reschedules itself if there are more non-exclusive commands in the buffer 54 (step 217).

Referring now to FIGS. 13A–13H and 14, the detailed operations of the trick play processing state machine can be explained. Beginning with FIG. 13A, the operations performed as part of interpreting the "play ready" exclusive command (step 156) can be discussed in detail. The "play ready" command instructs the ASIC to prepare its internal state and DRAM buffers to begin decoding and displaying video data. Ordinarily, the "play ready" command is executed as part of a global reset of the ASIC when, for example, the device incorporating the ASIC is first powered on.

To begin processing the "play ready" command, the current state of the trick play processing state machine is evaluated (step 250). If the current state is other than STOP or PAUSE, then the system is already prepared for video decoding and display. In this situation, the valid exclusive command flag is cleared (step 252), so that default processing for the current state will be performed for subsequent fields. Thereafter, processing of the play ready command is done (step 254).

If the current state of the trick play processing state machine is STOP or PAUSE, then the current state of the "play ready" flag is evaluated (step 256). This flag is set whenever the "play ready" exclusive command has been successfully executed. If this flag is set, then it is not necessary to reexecute the play ready command, and processing proceeds to step 252, and resets the valid exclusive command flag, and processing is done.

If the current state is STOP or PAUSE and the "play ready" flag is not set, then the processing of the play ready command commences. In step 258, a trick play counter is decremented. This counter is initialized upon a global software reset to a predetermined value such as 6, to designate the number of fID transitions that will transpire before the software reset is completed. The counter is used in interpreting the "play ready" exclusive command to delay the completion of this command. Specifically, in step 260, the current value of the counter is used to branch to a number of processes. If the value of the counter is greater than 4 (step 262), then processing completes without further action. As a consequence, during the next fID transition, when processing passes through the state transition handler (FIG. 9), the valid state transition flag will remain set, and processing will proceed to interpret the exclusive command via the routine of FIG. 10. This will cause the "interpret play ready" routine of FIG. 13A to be re-executed, and control will pass again through steps 250, 256 and 258. In this second and each subsequent pass through these steps during subsequent fID transitions, the trick play counter will be decremented in step 258.

Ultimately, in step 260, the trick play counter will reach a value of 3, in which case processing will proceed to step 266, in which the MPEG headers of the first MPEG group of pictures (GOP) in the DRAM buffer of the ASIC will be interpreted. After these headers are interpreted, the processing will be complete.

In the next pass through the "play ready" processing routine, the trick play counter will have a value of 2, and processing will proceed from step 260 to step 268, in which processing will locate the first presentable picture (FPP) of the MPEG GOP in the DRAM buffer of the ASIC. This operation may involve skipping B frames located at the beginning of the first GOP in the buffer, in those cases where the GOP does not have an I reference frame at the beginning of the GOP. After locating the FPP, then the decoding engine of the ASIC is initiated to perform slice decoding on the slices of the FPP of the MPEG GOP in the DRAM buffer (step 270). Thereafter, processing is complete.

In the next pass through the "play ready" processing routine, the trick play counter will have a value of 1, in which case processing will return without further action.

Finally, in the last pass through the "play ready" processing routine, the trick play counter will have a value of 0, in which case processing proceeds to step 272, in which the ASIC determines whether the host as instructed the ASIC to disable audio output (through a non-exclusive command). If not, then in step 274, the audio output is enabled. After step 272 or 274, processing proceeds to step 276, in which the "play ready" flag is set, and then to step 278, in which the valid exclusive command flag is cleared, so that default processing for the current state will be performed thereafter. Next, in step 280, the "play ready" command is acknowledged to the host, so that the host can determine that the command has been successfully executed and the ASIC is now ready for playback. In step 282, the trick play processing state machine transitions to its PAUSE state, ready for playback. After this processing, the "play ready" command processing is done (step 254).

Figure 13A:
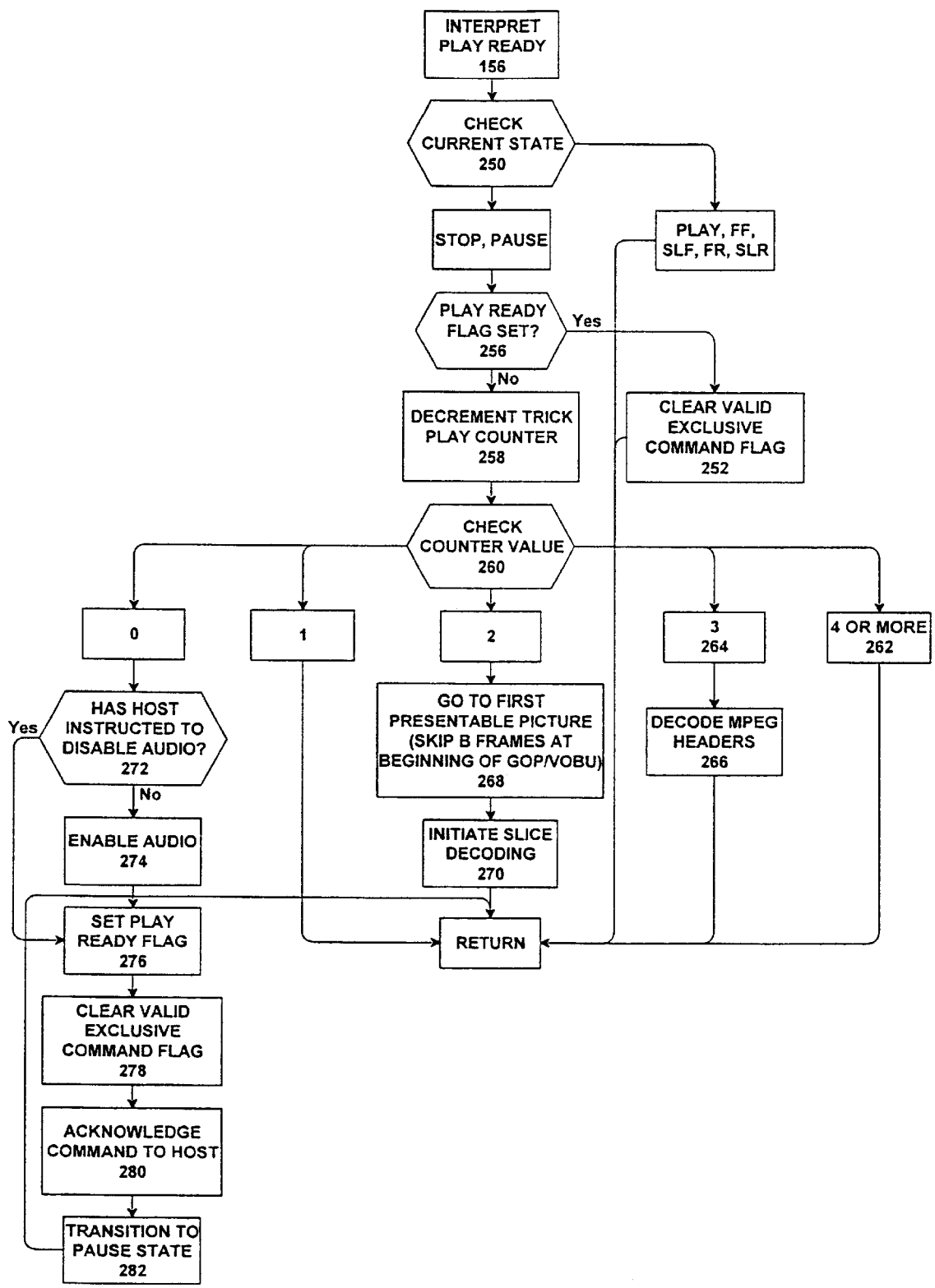
FIGS. 13A, 13B, 13C, 13D, 13E, 13F, 13G and 13H are flow charts of the detailed operations of the trick play processing state machine provided by the programming of the RISC CPU.
Figure 13B:
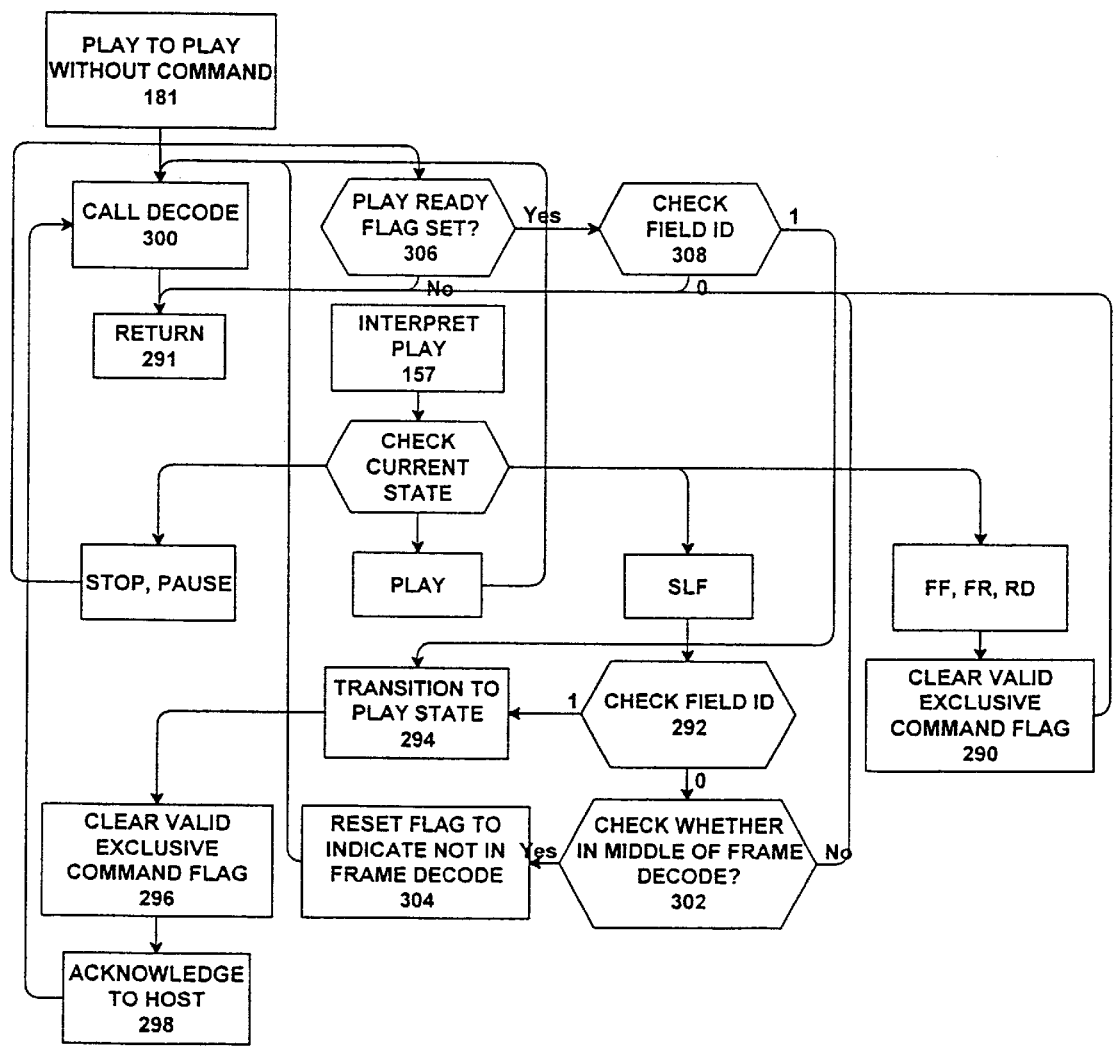

Referring now to FIG. 13B, the processing of the "play" exclusive command and the default processing in the PLAY state of the trick play processing state machine can be described. When a new "play" exclusive command is processed (step 157), the current state of the state machine is evaluated to determine the appropriate action to take. If the current state of the state machine is FF (fast forward), FR (fast reverse) or RD (reverse decode), the transition to PLAY is not permitted. Accordingly, in these cases the valid exclusive command flag is cleared (step 290), so that the trick play processing state machine will ignore the "play" command and will not acknowledge it to the host. Processing is then done (step 291).

If the current state of the trick play processing state machine is SLF (slow forward), then the current field ID (fID) is checked (step 292) to determine whether a transition from the SLF to PLAY states is appropriate at the current time. As will be seen, transitions from one state to another are only permitted when field 1 (the bottom field) is currently being displayed, so that the state transition begins upon display of field 0 (the top field). This restriction ensures that the top field is always appropriately displayed on the even scan lines and the bottom field is displayed on the bottom scan lines. Accordingly, if the fID is 1 in step 292, then processing proceeds to step 294, in which the trick play processing state machine transitions to the PLAY state, and then to step 296 in which the valid exclusive command flag is cleared. Thereafter, in step 298, the execution of the "play" trick play command is acknowledged to the host, so that the host can determine that the command was successfully executed. Finally, in step 300, a decode subroutine is called to cause the next field to be decoded.

If, in an attempted transition from the SLF state to the PLAY state, it is determined in step 292 that the fID is 0, then the transition to PLAY must be delayed for the duration of one field. In this case, processing proceeds to step 294, in which a flag is checked to determine whether the trick play processing state machine is in the middle of a frame decode as part of processing the SLF state. As will be noted below, in the SLF state, at a periodic interval, a new frame is decoded and displayed, and between these occurences, the current frame is repeatedly displayed. If a state transition command is received while a new frame is being decoded in the SLF state, it is critical that the state transition handler complete the decoding of the new frame before transitioning from the SLF state. To facilitate this, when a new frame is being decoded in the SLF state or other similar states, a flag is set to indicate that the trick play processing state machine is in the midst of decoding a new frame. In step 302, this flag is checked to determine whether a new frame is currently being decoded. If not, then processing is done for the current field (step 291). Note that, in this instance, the valid exclusive command flag is not cleared, so that the "play" trick play command handler of FIG. 13B will be reexecuted during the next field, at which time fID will be 1 and the state transition to the PLAY state can be completed.

If in step 296, there is a set flag, indicating that the trick play processing state machine is in the midst of decoding a new frame for the SLF state, then processing proceeds to steps 304 and 300. In step 304, the flag is cleared, to indicate that the new frame decoding for the SLF state is done. Then, in step 300, the decode subroutine is called, to complete the decoding of the new frame for the SLF state. After step 300, processing is done (step 291). Here again, note that the valid state transition flag is not cleared, with the consequence that the "play" trick play command handler of FIG. 13B will be reexecuted during the next field, at which time fID will be 1 and the state transition to the PLAY state can be completed.

If, when a "play" trick play command is received, the trick play processing state machine is in the STOP or PAUSE states, then processing proceeds to step 306. In step 306, the condition of the play ready flag is checked. Normally, the play ready flag will be set, but if it is not set then the PLAY command must be ignored, by immediately returning (step 291). If the "play ready" flag is set, however, then processing proceeds to step 308, in which the current fID is checked. If the current fID is 0, then the state transition to the PLAY state must wait for the duration of one field, for reasons identified above. Accordingly, in this situation processing immediately ends (step 291). If, however, the current fID is 1, then processing proceeds to steps 294, 296 and 298, in which, as discussed above, the trick play processing state machine enters the PLAY state, clears the valid exclusive command flag and acknowledges successful execution of the command to the host, and then calls the decode subroutine to begin the decoding and display of frames in the PLAY state.

If the trick play processing state machine is in the PLAY state when a "play" trick play command is received, or if no trick play processing command is received and default processing of the PLAY state is performed (block 181), processing proceeds directly to step 300, in which the decode subroutine is called to decode a new field of video for display. Thus, after a successful transition to the PLAY state, for each fID a call is made to the decode subroutine, and processing of the trick play handler ends, so that new frames are continuously decoded and displayed.

Figure 13C:
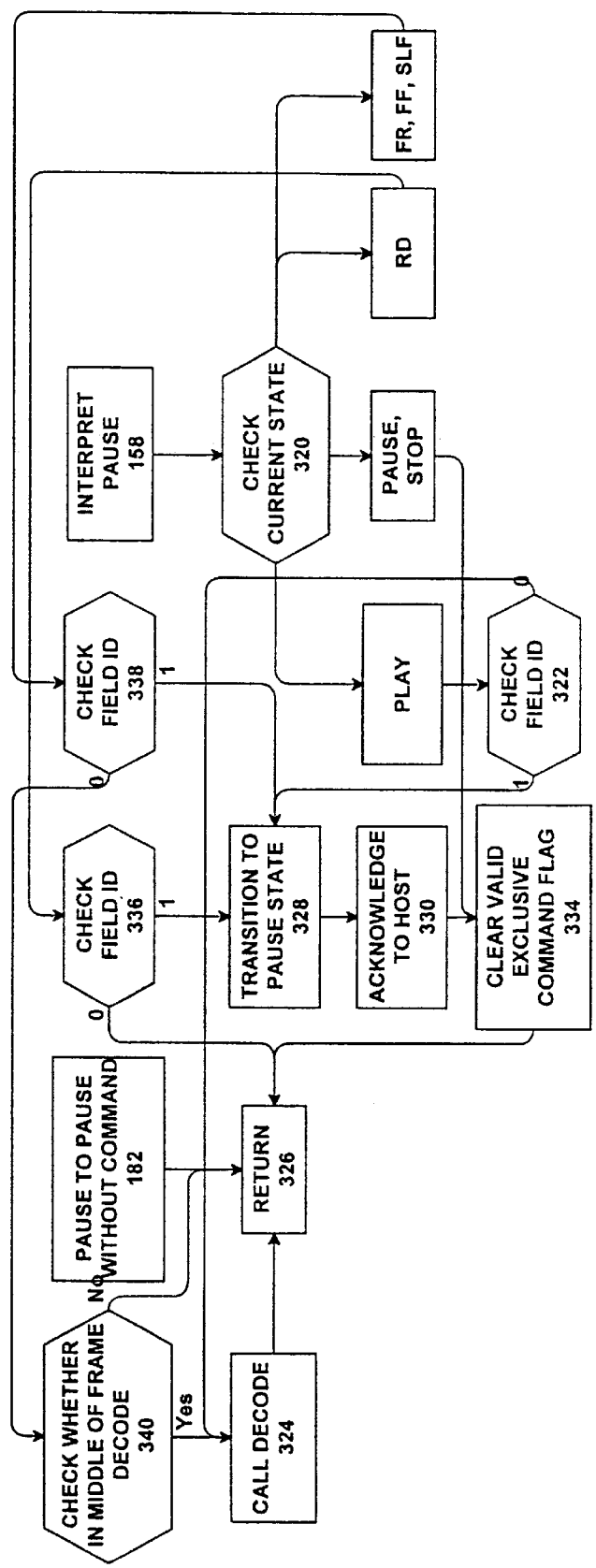

Referring now to FIG. 13C, the trick play processing for the PAUSE trick play state can be described. When a new "pause" trick play command is received, processing proceeds from block 158 to block 320, in which the current trick play state is evaluated. If the current trick play state is PLAY, then in step 322 the fID value is checked to determine whether it is appropriate to transition to the PAUSE state. As noted above, if the fID is zero, then the bottom frame is currently being displayed, and the transition to the PAUSE state should be delayed until after one more field has been decoded and displayed. Thus, in this situation, processing proceeds from step 322 to step 324, where the decode subroutine is called, causing the bottom field to be decoded and displayed. After calling the decode subroutine, processing proceeds to step 326, and the trick play processing is complete. Note under these conditions that the valid exclusive command flag is not cleared, so that upon the next transition of fID, processing will return to the PAUSE trick play handler, and pass through step 320 to step 322 again.

If in step 322, the fID value is 1, then it is appropriate to transition from the current PLAY state into the PAUSE state. Under these conditions, therefore, processing proceeds from step 322 to step 328, in which the transition is made to the PAUSE state. Then, in step 330, the "pause" trick play command is acknowledged to the host and in step 334, the valid exclusive command flag is cleared. After this processing, the transition to the PAUSE state has been completed, and the trick play handler is done (step 326).

Transitions from the STOP state to the PAUSE state are permitted regardless of the value of the fID, for the reason that no frames are displayed in the STOP state. Accordingly, if the current state is STOP when a "pause" exclusive command is received, then the trick play state transition handler of step 13C proceeds directly to steps 328, 330 and 334 described above, in which the transition is made to the PAUSE state and the "pause" trick play command is acknowledged to the host.

Transitions from the RD (reverse decode) state to the PAUSE state are permitted only when fID is zero. Accordingly, if the current state is RD when the "pause" trick play command is received, processing proceeds to step 336. If in step 336, fID is 0, then the state transition cannot occur until one field later. Under these conditions, therefore, processing proceeds to step 326 and the trick play handler of FIG. 13C is done. It will be noted that the transition to PAUSE from the RD state is different than the transition from the PLAY state described above, in that the transition from the RD state does not call the decode subroutine even when fID is 0, whereas in the PLAY state, the decode subroutine is called when fID is 0. In the RD state, it is unnecessary to call the decode subroutine with each fID transition, as the decoding of frames is handled by a separate and independent task from the state transition handler, as is described in more detail below. As a consequence, it is not necessary to call the decode handler as part of transitioning from the RD state, even when fID is 0 in step 336 and as a result the transition must be delayed for one field.

If in step 336, fID is 1, then the transition from the RD state to the PAUSE state can be performed immediately. In this circumstance, processing proceeds from step 336 directly to steps 328, 330 and 334, causing the transition to the PAUSE state and acknowledging the "pause" trick play command to the host.

If in step 320, the current state is FR (fast reverse), FF (slow reverse) or SLF (slow forward), then processing of a transition to the PAUSE state proceeds to step 338. In step 338, it is determined whether fID is 1. If fID is 1, then the transition to the PAUSE state can begin immediately, and consequently processing proceeds directly to steps 328, 330 and 334 as described above. However, if fID is 0 in step 338, then the transition to the PAUSE state must be delayed for one field. In this circumstance, processing continues to step 340, in which internal flags are evaluated to determine whether the trick play state machine is in the process of decoding a new frame as part of processing in the FR, FF or SLF states. As noted above and elaborated below, when in the SLF, FF or FR states, periodically a new frame is decoded for output, and between these occurrences, frames that have previously been decoded are repeatedly displayed. Flags are set in each of these states to indicate when a new frame is in the process of being decoded. If processing of any of these states is in the midst of decoding a new frame, then the decode subroutine must be called to ensure this decoding is completed before a transition is made to the PAUSE state. Accordingly, if in step 340 it is determined that the prior SLF, FF or FR state is in the midst of decoding a new frame, processing proceeds to step 324, in which the decode subroutine is called to complete the decoding, and then processing is done (step 326). If the prior SLF, FF or FR state is not in the midst of decoding a new frame, processing proceeds from step 340 directly to step 326.

After the PAUSE state has been entered, until a new exclusive command is received, default processing is performed. Because no new frames are decoded when the state machine remains in the PAUSE state, default processing for the PAUSE state (step 182) proceeds directly to step 326 to complete processing.

Figure 13D:
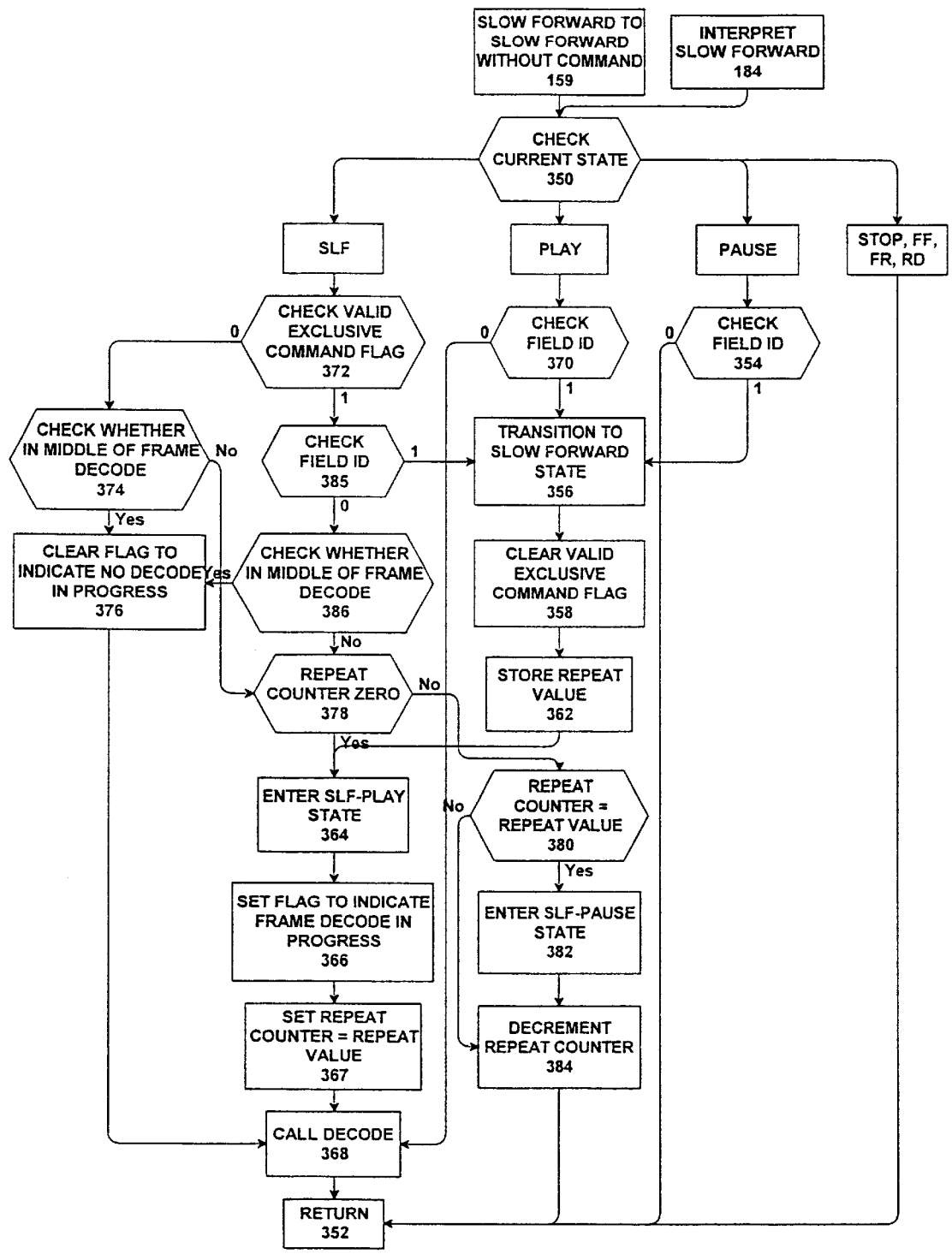

Referring now to FIG. 13D, trick play state transitions for a "slow forward" exclusive command can be explained. Upon receipt of a new "slow forward" exclusive command, processing sequences through step 159 to step 350. Default processing in the SLF state proceeds from step 184 to step 350 as well. In step 350, the current state is determined and appropriate further actions are taken.

If the current state is STOP, FF (fast forward), FR (fast reverse) or RD (reverse decode), a transition to the SLF state is not permitted. In this circumstance, therefore, processing proceeds directly to step 352 and the state transition handler of FIG. 13D is completed.

If the current state is PAUSE when a "slow forward" exclusive command is received, processing proceeds to step 354, in which the current fID is checked. As noted above, state transitions are only permitted when fID is 1. Accordingly, if fID is 0 in step 354, processing proceeds to step 352 and is done. If, however, fID is 1 in step 354, then processing continues to step 356, in which the trick play state machine sequences to the SLF state. Next, in step 358, the valid exclusive command flag is cleared, so that default processing will be performed for subsequent video fields. Then, in step 362, a repeat value identified in the "slow forward" exclusive command is stored into the memory of the ASIC, for use in later determinations of the speed at which the slow forward processing should proceed. Specifically, in the SLF state, a frame is decoded, and then display of this frame is repeated for a number of times identified by the repeat value, after which a new frame is decoded. The repeat value identifies a number of times a repeated field will be output before the next frame is decoded, and accordingly typically is an even number in the range of 1 to 10 or more, based upon the slowness of playback that is desired.

When the SLF state is initially entered, a single frame is decoded, and then is repeatedly displayed for the number of times identified by the repeat value. Accordingly, after step 362, in step 364 the trick play state machine enters the sub-state SLF-PLAY, during which a new frame is decoded. Subsequently, in step 366, a flag is set to indicate that processing of the SLF state is in the midst of decoding a frame. This flag is used in this and other state transition handlers to ensure that frame decoding is completed prior to a state transition. Then, processing proceeds to step 367, in which a repeat counter is initialized with the repeat value from the SLF command that was stored in step 362. The repeat counter is later used to determine the number of times that the current frame should be displayed. Then, in step 368 the decode subroutine is called to begin decoding the new frame. Processing is then done (step 352).

When a "slow forward" exclusive command is received in the PLAY state, processing very similar to that for the PAUSE state is performed. When the command is received in the PLAY state, in step 370, the current value of fID is checked. If fID is 1, the transition to the SLF state can proceed immediately, and processing proceeds to steps 356 through 368 as described above in connection with the transition from PAUSE to SLF. If, however, fID is 0, then the transition from the PLAY state to SLF must wait for one more field. In this situation, processing proceeds to step 368, in which the decode subroutine is called. This ensures that decoding of the current frame in the PLAY state is completed. After step 368, processing is done (step 352).

When a "slow forward" exclusive command is received in the SLF state, or when default processing of the SLF state is performed, processing proceeds to step 372, in which the value of the valid exclusive command flag is checked. Assuming default processing is being performed, and no new SLF command has been received, in step 372, the valid exclusive command flag will be cleared, in which case processing proceeds to step 374. In step 374, a determination is made, based on the flag described above, whether decoding of a new frame in the SLF state is underway. If so, then processing proceeds to step 376, in which the flag is cleared to indicate that decoding is no longer in process, and then to step 368 in which the decode routine is called to complete the decoding of the frame.

If in step 374, it is determined that decoding of a new frame is not underway, then processing proceeds to step 378, in which the repeat counter described above is compared to zero. If the repeat counter reaches a value of zero, then it is time to begin decoding of a new frame.

If in step 378, the repeat counter is not zero, then processing continues to step 380 in which the repeat counter is compared to the initial repeat value obtained with the command. If the counter is equal to the value in step 380, this indicates that the current pass through the subroutine of FIG. 13D, is the first pass through this subroutine after a transition to the SLF state, because the repeat counter has as yet not be decremented. Therefore, when the repeat counter is still equal to its initial value in step 380, processing continues to step 382 in which the ASIC enters the SLF-PAUSE sub-state, indicating that the current frame will be output repeatedly until the repeat counter is decremented to zero. After step 382, or immediately after step 380 if the repeat counter is not equal to its initial value, in step 384 the value of the repeat counter is decremented. Then processing continues to step 352, and is done. Note that no new frames are decoded under these circumstances, and as a consequence the same frame is output repeatedly until the repeat counter is decremented to zero.

Ultimately, barring any other action by the host, the repeat counter is decremented to zero, and when this is done, in the next pass through the subroutine of FIG. 13D, processing will proceed from step 378 to steps 364 through 367, described above, in which the decoding of another frame is initiated.

Returning now to step 372, under certain circumstances a new "slow forward" command may be received while the trick play state machine is already in the SLF state. For example, the host may wish to change the repeat counter value to generate faster or slower playback. Under these circumstances, in step 372 the valid exclusive command flag will be set. In this case, processing proceeds to step 385, in which the current fID is checked. If the current fID is 1, then the new "slow forward" command can be immediately executed, and processing proceeds to steps 356 through 368 as described above, which among other things stores the new repeat value from the new "slow forward" command and begins the decoding of a new frame.

If in step 385, the current fID is 0, then the new "slow forward" command cannot be immediately processed, and the subroutine proceeds to step 386, where the flag described above is checked to determine whether decoding of a frame is in process. If a new frame is currently being decoded, then processing proceeds to steps 376 and 368, described above, to reset the flag and complete the decoding of the frame. If a new frame is not currently being decoded, then processing proceeds to step 378, described above, to determine whether the repeat counter has reached a zero value, and if so to begin decoding a new frame.

Figure 13E:
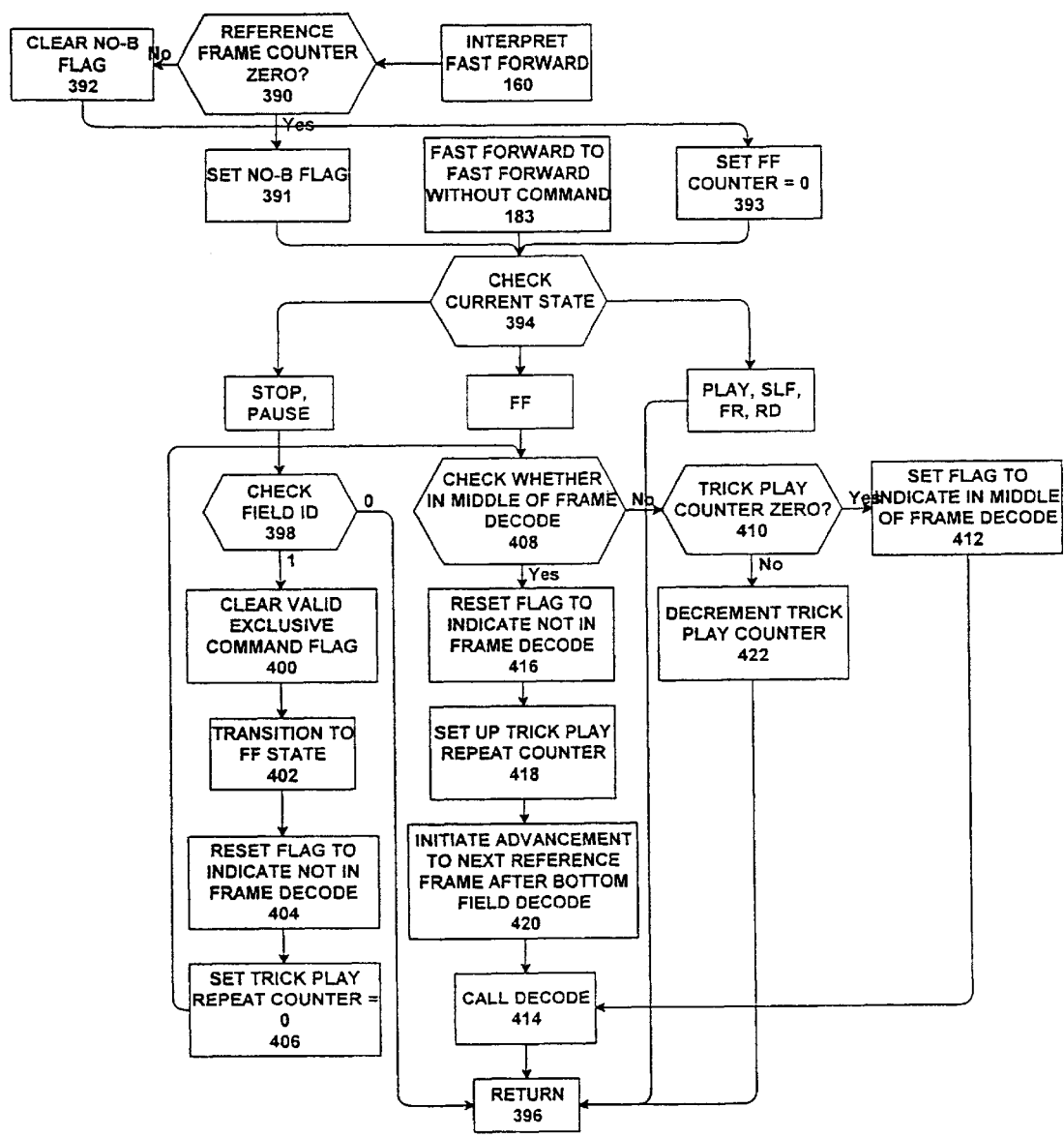

Referring now to FIG. 13E, trick play state transitions for a "fast forward" exclusive command can be explained. Upon receipt of a new "fast forward" exclusive command, processing sequences through step 160 to step 390. In step 390, a reference frame counter in the "fast forward" command is evaluated, to determine how the "fast forward" command is to be executed. In the FF state, reference frames from the MPEG video stream are decoded and displayed. A set number of reference frames from each MPEG video object unit (VOBU) are decoded, and then processing skips to reference frames in the next VOBU. The reference frame counter delivered with the "fast forward" command identifies the number of reference frames that are to be decoded from each VOBU. The FF state also has a special "no-B" mode, in which every reference frame from each VOBU is decoded and displayed. If the reference frame counter with the "fast forward" command has a value of zero, then the FF state enters the "no-B" mode.

Accordingly, in step 390, the reference frame counter in the "fast forward" command is compared to zero, and if the reference frame counter is zero, then in step 391 a "no-B" flag is set to enter the "no-B" FF mode. If the reference frame counter is other than zero, then in step 392 the "no-B" flag is cleared, and subsequently in step 393 a FF counter used to count the number of reference frames output from the current VOBU, is initialized to a value of zero (the FF counter is not used in the "no-B" mode and so is not initialized after step 391).

After step 391 or 393, processing arrives at step 394 in which the current state is determined and appropriate further actions are taken. Default processing in the FF state (step 183) proceeds directly to step 394.

If the current state is PLAY, SLF (slow forward), FR (fast reverse) or RD (reverse decode), a transition to the FF state is not permitted. In this circumstance, therefore, processing proceeds directly to step 396 and the state transition handler of FIG. 13E is completed.

If the current state is STOP or PAUSE when a "fast forward" exclusive command is received, processing proceeds to step 398, in which the current fID is checked. As noted above, state transitions are only permitted when fID is 1. Accordingly, if fID is 0 in step 398, processing proceeds to step 396 and is done. If, however, fID is 1 in step 398, then processing continues to step 400, in which the valid exclusive command flag is cleared, so that default processing will be performed for subsequent video fields. Next, in step 402, the trick play state machine sequences to the FF state. Next, in step 404, the flag discussed earlier is reset to indicate that a frame decode is not currently underway. Then, in step 406, a trick play counter is initialized to a zero value, for use in later determinations of the speed at which the fast forward processing should proceed. Specifically, in the FF state, a reference frame is decoded, and then display of this frame is repeated for a number of times identified by a repeat value received with the "fast forward" command, after which a new reference frame is decoded. The repeat value identifies a number of times a repeated field will be output before the next frame is decoded, and accordingly typically is an even number in the range of 1 to 10 or more, based upon the speed of fast forward playback that is desired. When the FF state is initially entered, a single frame is decoded, and then is repeatedly displayed for the number of times identified by the repeat value; to achieve this functionality, the trick play repeat counter is initialized to a value of zero.

If in step 394, the state machine is in the FF state, processing proceeds to step 408 to perform default processing. Also, after the various setup steps 398–406, processing also proceeds to step 408. In step 408, the flag discussed above is checked to determine whether the state machine is in the middle of decoding a new reference frame. As noted above, this flag will be cleared in step 404 during the first pass through the subroutine of FIG. 13E, and will also be cleared during subsequent passes through the subroutine while a previously-decoded reference frame is being repeatedly output. Under these circumstances, processing continues to step 410.

In step 410, the current value of the trick play repeat counter is evaluated to determine whether it has been decremented to a "0" value. As noted above, during the first pass through the subroutine of FIG. 13E, this counter will be reset to a "0" value in step 406. Furthermore, during subsequent passes, the counter will also reached a "0" value after a previously-decoded reference frame has been output for the requested number of times. Under these circumstances, processing continues to step 412.

In step 412, the decoding of a new reference frame is initiated. Specifically, a flag is set to indicate that processing of the FF state is in the midst of decoding a frame. Then, in step 414, the decode process is called to begin decoding of the frame, and processing is done (step 396).

After decoding of a new reference frame has commenced, for the next field output, processing will return to step 408. At this time, the flag set in step 412 will indicate a frame decode is underway. Accordingly, processing will proceed to step 416, in which this flag is reset so as to indicate that docoding is now done. Processing then proceeds to step 418, in which the trick play repeat counter is initialized to the value provided with the "fast forward" command, thus indicating the number of times that the newly-decoded frame should be repeated. Then, in step 420, a process is initiated to skip forward to the next reference frame.

The process initiated in step 420, will commence after the decoding of the second field for the current frame is completed. In essence, this process will move the appropriate next reference frame, by first determining whether the number of reference frames decoded from the current VOBU is equal to the number of reference frames identified by the reference frame counter obtained from the "fast forward" command in step 390. If not, or if the "no-B" flag is set, then this process will skip over B frames in the VOBU until a reference frame is encountered. If during this process the end of the VOBU is encountered, of if the number of reference frames decoded from the current VOBU is equal to the number identified by the reference frame counter, then the next VOBU is processed and the first reference frame in the next VOBU is located by skipping B frames.

After initiating the above-described process in step 420, the subroutine of FIG. 13E will proceed to step 414, in which the decode routine is called to decode the bottom field of the current frame.

After the processing described above, during default processing in the FF state, control will again pass to step 408, and since a frame decode is not in process and the trick play counter is not zero, control will flow through steps 408 and 410 to step 422. In step 422, the trick play counter is decremented, and processing is done. This flow through steps 408, 410 and 422 will repeat until the trick play counter is decremented to zero, at which time flow will pass from step 408 through steps 410, 412 and 414 as described above, and then for the next field, from step 408 to steps 416, 418, 420 and 414, thus resetting the trick play counter and decoding a new reference frame.

It will be noted that when a "fast forward" exclusive command is received in the FF state, processing proceeds to step 390, in which the reference frame counter from the new "fast forward" command is compared to zero, and stored. At the same time, the initial value for the trick play repeat counter from the "fast forward" command, is stored. Accordingly, the host may use a new "fast forward" command to change the counter values to generate faster or slower playback.

Figure 13F:
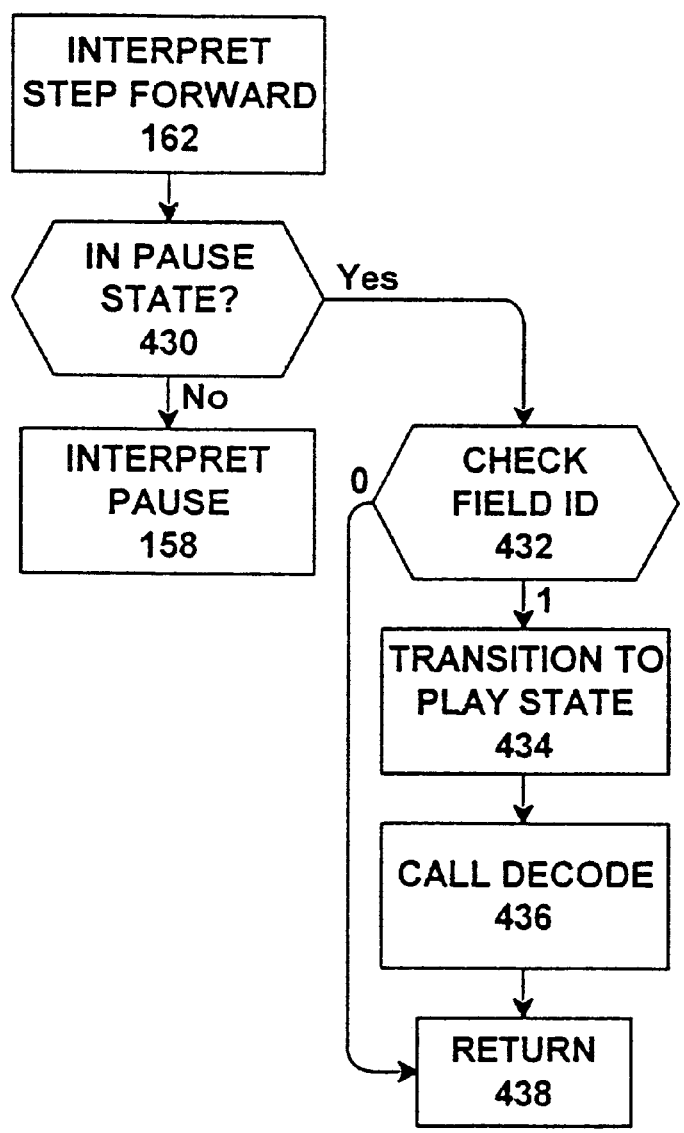

Referring now to FIG. 13F, trick play state transitions for a "step forward" exclusive command can be explained. The "step forward" command is interpreted as a "pause" command whenever the trick play state machine is other than in the PAUSE state. When the trick play state machine is in the PAUSE state, the "step forward" command causes a single frame to be forward decoded.

Accordingly, when the "step forward" command is interpreted (step 162), in step 430 a test is performed to determine whether the current state is PAUSE. If not, then processing proceeds to interpret the "step forward" command as if it is a "pause" command, by proceeding to step 158 (see FIG. 13C).

If the current state is PAUSE when a "step forward" command is received, then processing continues from step 430 to step 432. In step 432, the current fID is evaluated. If the current fID is 0, then state transitions are disallowed, and the subroutine returns (step 438). As a result, no frames are decoded and the state machine remains in PAUSE for the duration of one more field. If this occurs, during the next field, control will return to the subroutine of FIG. 13F, at which time fID will be 1, when state transitions are allowed. Under these circumstances, processing proceeds from step 432 to step 434, in which the state of the state machine in transitioned to the PLAY state. Then, in step 436, the decode subroutine is called to decode the top field of the next frame, and the subroutine of FIG. 13F returns. Note that the valid exclusive command flag is not changed. As a consequence, during the next field (fID=0), processing will proceed to step 162 and the subroutine of FIG. 13F. At this time, in step 430 the current state will be PLAY, so that control will then pass to step 158 and the subroutine of FIG. 13C. As can be seen from the above description of FIG. 13C, under these conditions control will flow through steps 320, 322, 324 and 326, during which the decode subroutine will be called to decode the bottom field of the new frame. Notably, however, once again the valid exclusive command flag is not changed. As a consequence, during the next field (fID=1), processing will proceed to step 162 and the subroutine of FIG. 13F. At this time, in step 430 the current state will be PLAY, so that control will then pass to step 158 and the subroutine of FIG. 13C. As can be seen from the above description of FIG. 13C, under these conditions control will flow through steps 320, 322, 324 and 326, during which the decode subroutine will be called to decode the bottom field of the new frame. Notably, however, once again the valid exclusive command flag is not changed and the state machine remains in the PLAY state. As a consequence, during the next field (fID=1), processing will proceed to step 162 and the subroutine of FIG. 13F. In step 430, the current state will still be PLAY, so that control will then pass to step 158 and the subroutine of FIG. 13C. As can be seen from the above description of FIG. 13C, under these conditions control will flow through steps 320, 322, 328, 330, 334 and 326, during which the decode subroutine will be called to decode the bottom field of the new frame. Furthermore, the valid exclusive command flag is cleared and the state of the state machine returns to PAUSE. Thus, the overall result is that a single frame is forward decoded and output, and the state transitions from PAUSE, to PLAY, and then back to PAUSE.

Figure 13G:
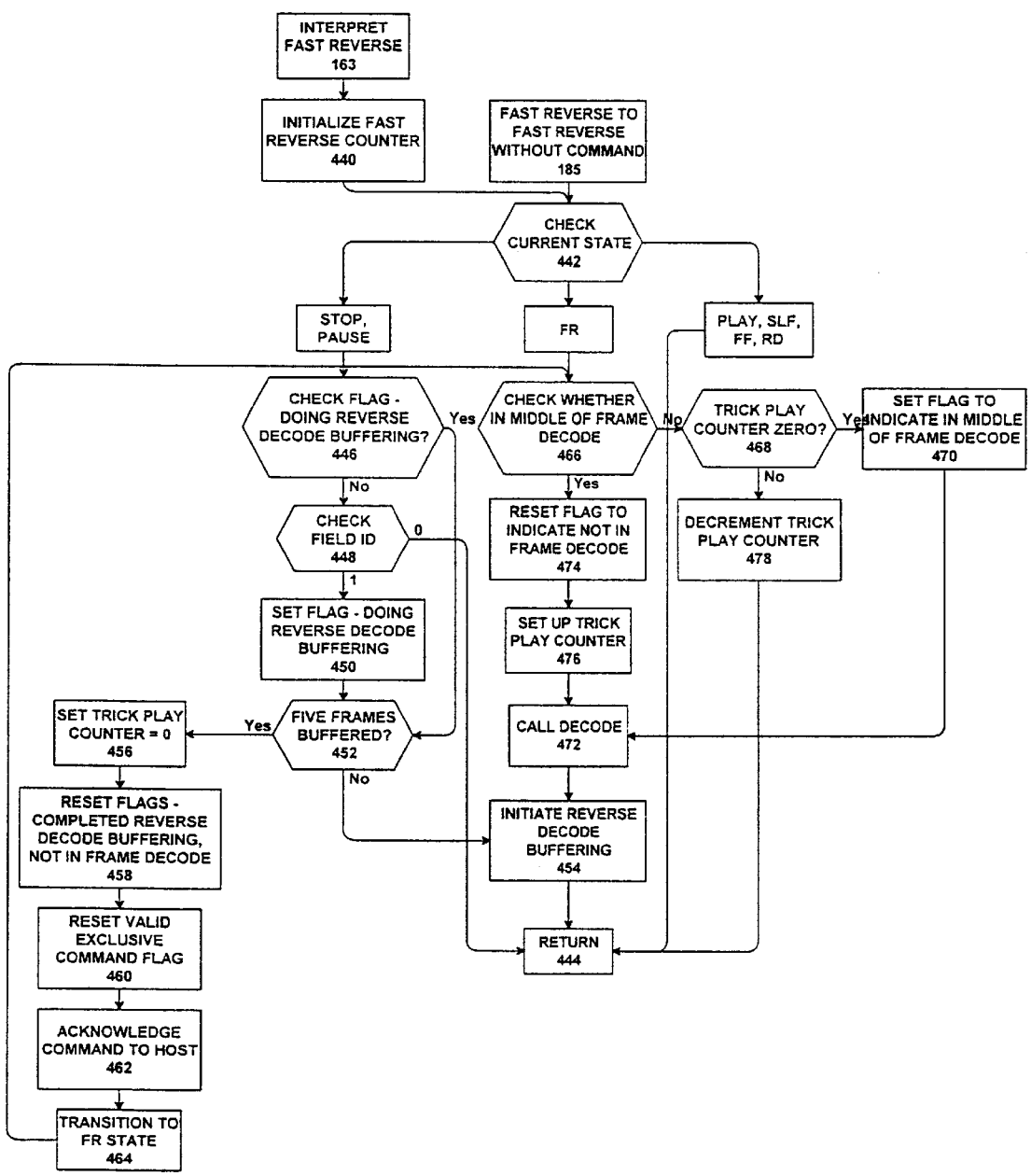

Referring now to FIG. 13G, trick play state transitions for a "fast reverse" exclusive command can be explained. Upon receipt of a new "fast reverse" exclusive command, processing sequences through step 163 to step 440. In step 440, a reference frame counter in the "fast reverse" command is obtained, to determine how the "fast reverse" command is to be executed. In the FR state, reference frames from the MPEG video stream are decoded and displayed. A set number of reference frames from each MPEG video object unit (VOBU) are decoded, and then processing skips to reference frames in the next VOBU. The reference frame counter delivered with the "fast reverse" command identifies the number of reference frames that are to be decoded from each VOBU.

After step 440, processing arrives at step 442 in which the current state is determined and appropriate further actions are taken. Default processing in the FR state (step 185) proceeds directly to step 442.

If the current state is PLAY, SLF (slow forward), FF (fast forward) or RD (reverse decode), a transition to the FR state is not permitted. In this circumstance, therefore, processing proceeds directly to step 444 and the state transition handler of FIG. 13G is completed.

If the current state is STOP or PAUSE when a "fast reverse" exclusive command is received, processing proceeds to step 446, in which a flag is checked to determine whether the initial buffering operation of a reverse decoding task is underway. While in the "fast reverse" state, a reverse decoding task is active and continuously decoding video data and buffering decoded video data so that it can be subsequently output. This task must perform initial buffering of decoded reference frames prior to beginning fast reverse playback.

If the reverse decode buffering task has not been initiated, then control passes from step 446 to step 448, in which the current fID is checked. As noted above, state transitions are only permitted when fID is 1. Accordingly, if fID is 0 in step 448, processing proceeds to step 444 and is done. If, however, fID is 1 in step 448, then processing continues to step 450, in which a flag is set to indicate that the initial reverse decode buffering is underway. After step 450, or immediately after step 446 if reverse decode buffering was already active, in step 452 an analysis is made to determine whether five reference frames have been decoded and buffered by the reverse decode buffering task. Initially, this will not be the case, and control will pass to step 454, in which the reverse decode buffering is initiated, and then the subroutine returns (step 444).

Note that in the foregoing pass through steps 452 and 444, the state was not changed and the valid exclusive command flag was not cleared. As a consequence, for the next few fields, control will be passed to the subroutine of FIG. 13G, and will flow through steps 442, 446, 452 and 454, repeatedly initiating reverse decode buffering, until five reference frames have been reverse decoded and buffered. Ultimately, when five reference frames have been decoded and buffered, control will pass from step 452 to step 456.

In step 456, a trick play counter is initialized to a zero value, for use in later determinations of the speed at which the fast reverse processing should proceed. Specifically, in the FR state, a reference frame is decoded, and then display of this frame is repeated for a number of times identified by a repeat value received with the "fast reverse" command, after which a new reference frame is decoded. The repeat value identifies a number of times a repeated field will be output before the next frame is decoded, and accordingly typically is an even number in the range of 1 to 10 or more, based upon the speed of fast reverse playback that is desired. When the FR state is initially entered, a single frame is decoded, and then is repeatedly displayed for the number of times identified by the repeat value; to achieve this functionality, the trick play repeat counter is initialized to a value of zero.

After step 456, control passes to step 458, in which the flag checked in step 446 is cleared, to indicate that the initial reverse decode buffering is completed. At the same time, in step 458, a flag (discussed earlier) is reset to indicate that a frame decode is not currently underway. Next, in step 460, the valid exclusive command flag is cleared, so that default processing will be performed for subsequent video fields. Next, in step 462, the "fast reverse" command is acknowledged to the host, to indicate that fast reverse playback is about to begin. Then, in step 464, the trick play state machine sequences to the FR state. Processing then proceeds to step 466 to perform default processing in the FR state. Note that if in step 442, the state machine is in the FR state, processing also proceeds to step 466 to perform default processing. Accordingly, so long as no new exclusive commands are received, from this point on the processing of the state transition subroutine of FIG. 13G will pass to step 466.

In step 466, the flag discussed above is checked to determine whether the state machine is in the middle of decoding a new reference frame. As noted above, this flag will be cleared in step 458 during the initial pass through the subroutine of FIG. 13G. The flag will also be cleared during subsequent passes through the subroutine while a previously-decoded reference frame is being repeatedly output. Under these circumstances, processing continues to step 468.

In step 468, the current value of the trick play repeat counter is evaluated to determine whether it has been decremented to a "0" value. As noted above, during the initial first pass through the subroutine of FIG. 13G, this counter will be reset to a "0" value in step 456. Furthermore, during subsequent passes, the counter will also reached a "0" value after a previously-decoded reference frame has been output for the requested number of times. Under these circumstances, processing continues to step 470.

In step 470, the decoding of a new reference frame is initiated. Specifically, a flag is set to indicate that processing of the FR state is in the midst of decoding a frame. Then, in step 472, the decode process is called to begin decoding of the frame. Next, the reverse decode buffering process is reinitiated (step 454), and processing is done (step 444).

After decoding of a new reference frame has commenced, for the next field output, processing will return to step 466. At this time, the flag set in step 470 will indicate a frame decode is underway. Accordingly, processing will proceed to step 474, in which this flag is reset so as to indicate that decoding is now done. Processing then proceeds to step 476, in which the trick play repeat counter is initialized to the value provided with the "fast reverse" command, thus indicating the number of times that the newly-decoded frame should be repeated. Then, in step 472, the decode process is called to begin decoding of the frame. Then, in step 454, the reverse decode buffering process is re-initiated, and processing is done (step 444).

The process initiated in step 472, will commence after the decoding of the second field for the current frame is completed. In essence, this process will move the appropriate next reference frame, by first determining whether the number of reference frames decoded from the current VOBU is equal to the number of reference frames identified by the reference frame counter obtained from the "fast reverse" command in step 440. If not, then this process will skip over B frames in the VOBU until a reference frame is encountered. If during this process the end of the VOBU is encountered, of if the number of reference frames decoded from the current VOBU is equal to the number identified by the reference frame counter, then the next VOBU is processed and the first reference frame in the next VOBU is located by skipping B frames.

After initiating the above-described process in step 420, the subroutine of FIG. 13G will proceed to step 414, in which the decode routine is called to decode the bottom field of the current frame.

After the processing described above, during default processing in the FR state, control will again pass to step 466, and since a frame decode is not in process and the trick play counter is not zero, control will flow through steps 466 and 468 to step 478. In step 478, the trick play counter is decremented, and processing is done. This flow through steps 466, 468 and 478 will repeat until the trick play counter is decremented to zero, at which time flow will pass from step 466 through steps 468, 470, 472 and 454 as described above, and then for the next field, from step 466 to steps 474, 476, 472 and 454, thus resetting the trick play counter and decoding a new reference frame.

It will be noted that when a "fast reverse" exclusive command is received in the FR state, processing proceeds to step 440, in which the reference frame counter from the new "fast reverse" command is compared to zero, and stored. At the same time, the initial value for the trick play repeat counter from the "fast reverse" command, is stored. Accordingly, the host may use a new "fast reverse" command to change the counter values to generate faster or slower reverse playback.

Figure 13H:
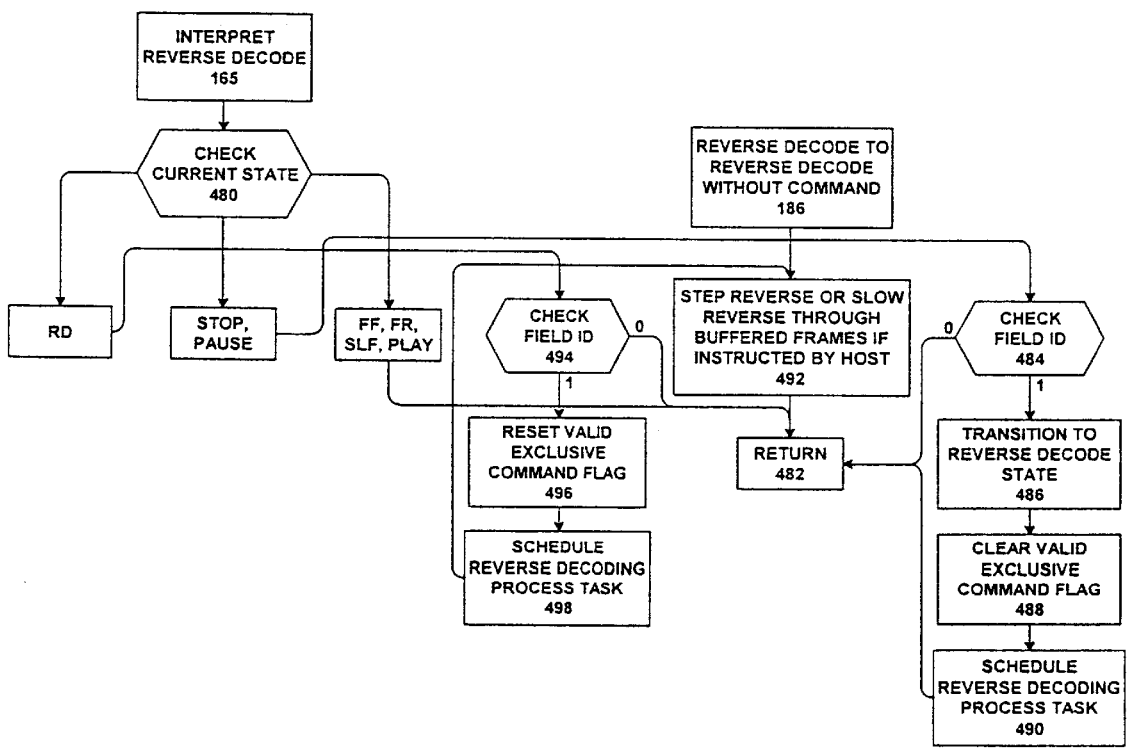

Referring now to FIG. 13H, the processing of a "reverse decode" exclusive command can be discussed. As an initial matter, it should be noted that slow reverse playback and step reverse playback are achieved by nonexclusive commands submitted by the host, after the host as used the "reverse decode" exclusive command to place the state machine into its RD state. While in the RD state, the ASIC decodes and buffers frames from the MPEG source, so that the buffered frames can be played back in reverse order, in either a slow reverse or step reverse manner.

As a first step in processing a "reverse decode" exclusive command (step 165), in step 480 the current state of the state machine is evaluated. If the state machine is currently in its FF, FR, SLF or PLAY states, transitions to the RD state are disallowed, and accordingly the subroutine of FIG. 13H immediately returns (step 482).

If the current state is either STOP or PAUSE, a transition to the RD state is permitted, and begins with step 484, in which the current value of fID is checked. As noted above, when fID is 0, state transitions are disallowed, and so under these circumstances the subroutine of FIG. 13H immediately returns (step 482). During the next field, or if fID is 1, processing continues from step 484 to step 486, in which the state machine transitions to the RD state, and then to step 488, in which the valid exclusive command flag is cleared, and finally to step 490, which schedules the reverse decoding process task, to cause the buffering of decoded frames to begin. Processing of the "reverse decode" exclusive command is then done (step 482).

Once in the RD state, default processing (step 186) is performed. In default processing, in step 492, frames are displayed in reverse order in either a slow reverse or step reverse manner, as instructed by the host in nonexclusive commands that have been received separately. Default processing is then done (step 482).

While in the RD state, a new "reverse decode" command may be received. If this occurs, then in step 494, in which the current value of fID is checked. When fID is 0, the subroutine of FIG. 13H immediately returns (step 482). During the next field, or if fID is 1, processing continues from step 494 to step 496, in which the valid exclusive command flag is cleared, and then to step 498, which schedules the reverse decoding process task in case the task has not already been scheduled. Processing then continues to step 492, where frames are displayed in reverse order in either a slow reverse or step reverse manner, as instructed by the host in nonexclusive commands that have been received separately. Processing of the new "reverse decode" exclusive command is then done (step 482).

Figure 14:
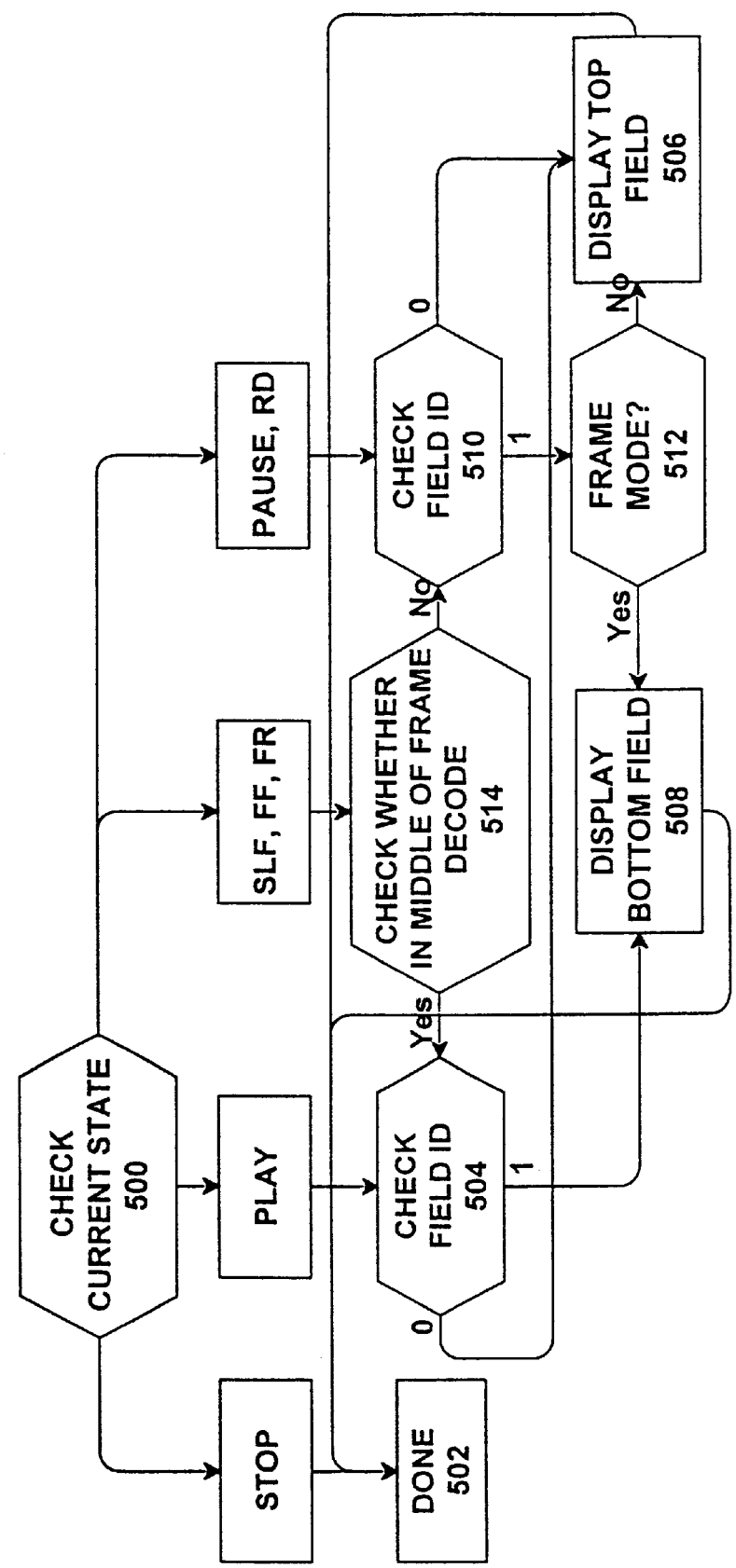
FIG. 14 is a flow chart of the display of top and bottom fields of video data during the global processes of the programming of the RISC CPU.

Referring now to FIG. 14, details are provided on the display of top and bottom fields of video data during the global processes of step 124 (FIG. 9). Initially, in step 500, the current state of the state machine is checked, since the fields may be displayed differently in different states.

In the STOP state, no fields are displayed, and so processing is done (step 502).

In the PLAY state, normal playback is performed, i.e., the top field is displayed while fID is 0, and the bottom field is displayed while fID is 1. Accordingly, in the PLAY state, processing continues to step 504, in which the current value of fID is evaluated. If fID is 0, then in step 506, the top field is displayed. If fID is 1, then in step 508, the bottom field is displayed.

In the PAUSE or RD states, the display is paused at a single frame, and that frame is repeatedly displayed. Accordingly, in these states, it is relevant whether the field or frame pause mode has been activated. If the field pause mode is active, then the top field of video data is displayed when fID is 0 and when fID is 1. The result is a lower resolution output, but without blur or "shimmer" than can be produced when there is motion between the fields. If the frame pause mode is active, then the top field of video data is displayed when fID is 0 and the bottom field is displayed when fID is 1. The result is a higher resolution output, that my have blur or "shimmer" when there is motion between the fields. Accordingly, in the PAUSE or RD states, in a first step 510, the value of fID is evaluated. If fID is 0, then regardless of the pause mode, the top field should be displayed, and so processing continues to step 506. If the fID is 1, however, then processing proceeds to step 512, in which the pause mode is evaluated. If the current pause mode is frame pause, then the bottom field should be displayed, and processing continues from step 512 to step 508. If, however, the current pause mode is field pause, then the top field should be displayed when fID is 1, and accordingly processing continues from step 512 to step 506.

In the SLF, FF or FR states, much of the time a singe frame is being repeatedly displayed, and in this situation the fields to be output should be selected in the same manner as in the PAUSE or RD states. However, in the SLF, FF or FR states, there are frequent times when a transition is being made from a frame to a subsequent frame. During these periods, the fields should be output in the same manner as is done in the PLAY state; i.e., the top field should be displayed when fID is 1, and then the bottom field should be displayed when fID is 0. Accordingly, in the SLF, FF or FR states, processing begins with step 514, in which the flag that has been discussed above, is checked to determine whether a frame decode is currently underway. When a frame decode is underway, then the display is in the process of transitioning from one frame to another. Accordingly, if the flag is set to indicate a frame decode is underway, control passes from step 514 to step 504, to handle display of the fields in the same manner as in the PLAY state. Alternatively, if a frame decode is not underway, control passes from step 514 to step 510, to handle display of fields in the same manner as in the PAUSE or RD states.

It will be noted that in the reverse playback states, i.e., in the FR state or in the RD state, when a transition is being made from one frame to another, it may be beneficial to reverse the playback of the fields; i.e., the bottom field may be played when fID is 0 and the top field played when fID is 1. If there is motion between the fields, playing the fields in this reverse manner will produce appropriate reverse motion in the display as the frame transition is effected. The embodiment shown in FIG. 14, plays the fields during reverse playback in the same manner as is done during forward playback; this may produce a disturbing temporal effect during reverse playback, as motion moves backward, then forward, then backward, etc. However, it will also be noted that reversing the displayed fields during reverse playback, will produce spacial distortion since the position of the scan lines will be incorrect. It is believed that this spacial distortion will be more disturbing than the temporal distortion created when fields are played back in the manner shown in FIG. 14. However, alternative embodiments of the invention could reverse the playback of the fields during reverse video playback modes.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of controlling a reduced instruction set central processing unit to provide management of receiving, storing, prioritizing, and acknowledging host commands for digital video processing to be performed by said central processing unit, comprising (A) receiving a host command;

(B) determining whether the host command is exclusive or non-exclusive, and (i) if exclusive, looking up instructions specific for the exclusive command, and storing the instructions in a command buffer, or if non-exclusive, looking up instructions specific for the non-exclusive command, and buffering the instructions in a command buffer; and (D) acknowledging receipt of the host command.

2. The method of claim 1, wherein the looking up instructions specific for the non-exclusive command is preceded by checking whether the command buffer is full, and if the command buffer is full, aborting without buffering of the instructions in a command buffer and without acknowledging receipt of the host command.

3. The method of claim 2, wherein the looking up instructions specific for the non-exclusive command further comprises categorizing the non-exclusive commands into types, and looking up instructions for the non-exclusive command within the category type.

4. The method of claim 1 wherein the buffering the instructions in a command buffer for the non-exclusive command is followed by sorting the command buffer by priority of the non-exclusive commands.

5. A method of controlling a reduced instruction set central processing unit to provide management of receiving, storing, prioritizing, and acknowledging host commands to be performed by said central processing unit, comprising (A) receiving a host command;

(B) determining whether the host command is exclusive or non-exclusive;

(C) if the host command is exclusive,
  (i) then
    (a) looking up instructions specific for the exclusive command; and
    (b) storing the instructions in a command buffer;

(ii) else
  (a) categorizing non-exclusive host command into a type;
  (b) looking up instructions specific for the non-exclusive command within the category type;
  (c) buffering the instructions in a command buffer;
  (d) scheduling execution of the instructions;
(D) acknowledging receipt of the host command.

6. The method of claim 5 wherein the buffering the instructions in a command buffer for the non-exclusive command is followed by sorting the command buffer by priority of the non-exclusive commands.

7. The method of claim 5 wherein the acknowledging receipt of the host command further comprises determining whether the acknowledge required task flag is set within the host command, and if the acknowledge required task flag is set, storing the host command to a command done buffer and incrementing executed command counter.

8. The method of claim 5 further comprising repetitively generating an interrupt to host message containing status information.

9. The method of claim 8 wherein the status information includes command done count, command acknowledge, and non-exclusive command buffer full.

10. The method of claim 5 wherein the looking up instructions specific for the non-exclusive command within the category type includes the types of system, trick play, on screen display (OSD) and sub-picture, video decoding type 1, video decoding type 2, audio decoding, and video display.

11. The method of claim 5, further comprising:
(E) executing the scheduled instructions.

* * * * *

UNITED STATES PATENT AND TRADEMARK OFFICE
CERTIFICATE OF CORRECTION

PATENT NO.     : 6,487,642 B1
DATED          : November 26, 2002
INVENTOR(S)    : Duruoz et al.

It is certified that error appears in the above-identified patent and that said Letters Patent is hereby corrected as shown below:

Title page,
Item [75], Inventors, "Chem I. Duruoz" should read -- Cem I. Duruoz --.

Column 2,
Line 67, reads "commands allows" and should read -- command allows --.

Column 3,
Line 40, reads "is block diagram" and should read -- is a block diagram --.

Column 5,
Line 23, reads "registered delivered" and should read -- registers delivered --.

Column 8,
Line 15, reads "(step 124) are performed" and should read -- (step 124) and performed --.

Column 11,
Line 51, reads "the host as instructed" and should read -- the host has instructed --.

Column 14,
Lines 24-25, read "FF (slow reverse)" and should read -- FF (fast forward) --.

Column 16,
Line 13, reads "not be decremented" and should read -- not been decremented --.

Column 18,
Line 2, reads "will also reached a" and should read -- will also reach a --.

Column 21,
Line 24, reads "will also reached a" and should read -- will also reach a --.

UNITED STATES PATENT AND TRADEMARK OFFICE
CERTIFICATE OF CORRECTION

PATENT NO.     : 6,487,642 B1
DATED          : November 26, 2002
INVENTOR(S)    : Duruoz et al.

It is certified that error appears in the above-identified patent and that said Letters Patent is hereby corrected as shown below:

Column 22,
Line 23, reads "the host as used" and should read -- the host has used --.
Lines 55-56, reads "step 494, in which the current value" and should read -- step 494, the current value --.

Column 23,
Line 26, reads "my have blur" and should read -- may have blur --.
Lines 38-39, reads "a singe frame" and should read -- a single frame --.

Column 24,
Line 24, reads "applicant's general" and should read -- applicants' general --.
Line 40, reads "(D) acknowledging receipt" and should read -- (C) acknowledging receipt --.

Signed and Sealed this

Eighteenth Day of November, 2003

JAMES E. ROGAN
*Director of the United States Patent and Trademark Office*